US012348695B2

(12) United States Patent
Minetani

(10) Patent No.: US 12,348,695 B2
(45) Date of Patent: Jul. 1, 2025

(54) IMAGE PROCESSING APPARATUS FOR PERFORMING TWO AUTHENTICATION STEPS AND SELECTING A PROCESSING FUNCTION BASED ON FIRST AUTHENTICATION

(71) Applicant: SEIKO EPSON CORPORATION, Tokyo (JP)

(72) Inventor: Yuto Minetani, Nagano (JP)

(73) Assignee: SEIKO EPSON CORPORATION, Tokyo (JP)

( * ) Notice: Subject to any disclaimer, the term of this patent is extended or adjusted under 35 U.S.C. 154(b) by 3 days.

(21) Appl. No.: 18/158,536

(22) Filed: Jan. 24, 2023

(65) Prior Publication Data
US 2024/0251052 A1 Jul. 25, 2024

(30) Foreign Application Priority Data
Jan. 24, 2022 (JP) .................................. 2022-008501

(51) Int. Cl.
*H04N 1/44* (2006.01)
*H04N 1/00* (2006.01)
(52) U.S. Cl.
CPC ......... *H04N 1/442* (2013.01); *H04N 1/00381* (2013.01); *H04N 1/4413* (2013.01)
(58) Field of Classification Search
CPC .. H04N 1/442; H04N 1/00381; H04N 1/4413; H04N 1/4426
See application file for complete search history.

(56) References Cited

U.S. PATENT DOCUMENTS

| 2006/0230286 | A1* | 10/2006 | Kitada | G06F 21/34 |
| | | | | 713/186 |
| 2016/0150124 | A1* | 5/2016 | Panda | G06F 3/1238 |
| | | | | 358/1.14 |
| 2016/0335511 | A1* | 11/2016 | Macdonald | G06V 40/18 |
| 2016/0349860 | A1* | 12/2016 | Wagatsuma | G06F 3/0481 |
| 2018/0060548 | A1* | 3/2018 | Yamashirodani | G06F 21/35 |
| 2019/0373136 | A1* | 12/2019 | Diaz | G06F 21/608 |

(Continued)

FOREIGN PATENT DOCUMENTS

JP 2021043546 A 3/2021

*Primary Examiner* — Benjamin O Dulaney
(74) *Attorney, Agent, or Firm* — CHIP LAW GROUP

(57) ABSTRACT

A processing system that permits an authenticated user to use an image processing apparatus provided with an operator and having a plurality of types of processing functions, the system including a reader that reads first authentication information from a recording medium on which the first authentication information is recorded in a readable manner, and a processor configured to acquire authentication success information indicating that authentication is performed based on second authentication information different from the first authentication information without touching the operator, and that causes the image processing apparatus to execute the plurality of types of processing functions. The processor selects a target processing function from the plurality of types of processing functions based on a reading state of the first authentication information by the reader, and causes the image processing apparatus to execute the target processing function when the authentication success information is acquired.

18 Claims, 14 Drawing Sheets

(56) References Cited

U.S. PATENT DOCUMENTS

| | | | | |
|---|---|---|---|---|
| 2020/0396342 A1* | 12/2020 | Terae | ................. | H04N 1/00076 |
| 2021/0073562 A1* | 3/2021 | Takeda | ................... | G06V 40/50 |
| 2021/0112168 A1* | 4/2021 | Takatoh | ............. | H04N 1/00896 |
| 2021/0271834 A1* | 9/2021 | Takakura | ................ | G06K 7/087 |
| 2023/0171355 A1* | 6/2023 | Narita | ..................... | H04L 63/08 |
| | | | | 358/1.13 |
| 2023/0308564 A1* | 9/2023 | Nakayama | ........... | H04N 1/4426 |

\* cited by examiner

IMAGE PROCESSING APPARATUS FOR PERFORMING TWO AUTHENTICATION STEPS AND SELECTING A PROCESSING FUNCTION BASED ON FIRST AUTHENTICATION

The present application is based on, and claims priority from JP Application Serial Number 2022-008501, filed Jan. 24, 2022, the disclosure of which is hereby incorporated by reference herein in its entirety.

BACKGROUND

1. Technical Field

The present disclosure relates to a processing system, an information processing apparatus, a non-transitory computer-readable storage medium storing a control program, and an image processing apparatus that permit an authenticated user to use an image processing apparatus having a plurality of types of processing functions.

2. Related Art

Before an image processing apparatus such as a multi-function machine executes processing functions such as printing, document reading, document copying, and the like, a server or the image processing apparatus authenticates a user by proximity operation of an ID card, input operation of user name and password, face authentication, and the like. Here, ID is an abbreviation for identification. An information processing apparatus disclosed in JP-A-2021-43546 displays a menu screen for selecting a processing function on a multifunction peripheral (MFP) after user authentication.

The techniques described above require the user to touch an operation portion of the MFP when selecting a processing function.

SUMMARY

According to an aspect of the present disclosure, there is provided a processing system that permits an authenticated user to use an image processing apparatus provided with an operation portion and having a plurality of types of processing functions, the system including a reading portion that reads first authentication information from a recording medium on which the first authentication information is recorded in a readable manner, and a processing portion configured to acquire authentication success information indicating that authentication is performed based on second authentication information different from the first authentication information without touching the operation portion, and that causes the image processing apparatus to execute the plurality of types of processing functions, in which the processing portion selects a target processing function from the plurality of types of processing functions based on a reading state of the first authentication information by the reading portion, and causes the image processing apparatus to execute the target processing function when the authentication success information is acquired.

In addition, according to another aspect of the present disclosure, there is provided an information processing apparatus coupled to an image processing apparatus provided with an operation portion and having a plurality of types of processing functions, the apparatus including an acquisition portion configured to acquire first authentication information read by a reading portion from a recording medium on which the first authentication information is recorded in a readable manner, and configured to acquire authentication success information indicating that authentication is performed based on second authentication information different from the first authentication information without touching the operation portion, and a selection execution portion that selects a target processing function from the plurality of types of processing functions based on a reading state of the first authentication information by the reading portion, and causes the image processing apparatus to execute the target processing function when the authentication success information is acquired by the acquisition portion.

Furthermore, according to still another aspect of the present disclosure, there is provided a non-transitory computer-readable storage medium storing a control program for permitting an authenticated user to use an image processing apparatus provided with an operation portion and having a plurality of types of processing functions, the control program that causes a computer to realize an acquisition function of being configured to acquire first authentication information read by a reading portion from a recording medium on which the first authentication information is recorded in a readable manner, and of being configured to acquire authentication success information indicating that authentication is performed based on second authentication information different from the first authentication information without touching the operation portion, and a selection execution function of selecting a target processing function from the plurality of types of processing functions based on a reading state of the first authentication information by the reading portion, and causing the image processing apparatus to execute the target processing function when the authentication success information is acquired by the acquisition function.

Furthermore, according to still another aspect of the present disclosure, there is provided an image processing apparatus having a plurality of types of processing functions, the apparatus including an operation portion, an acquisition portion configured to acquire first authentication information read by a reading portion from a recording medium on which the first authentication information is recorded in a readable manner, and configured to acquire authentication success information indicating that authentication is performed based on second authentication information different from the first authentication information without touching the operation portion, and a selection execution portion that selects a target processing function from the plurality of types of processing functions based on a reading state of the first authentication information by the reading portion, and executes the target processing function when the authentication success information is acquired by the acquisition portion.

DESCRIPTION OF EXEMPLARY EMBODIMENTS

Figure 1:
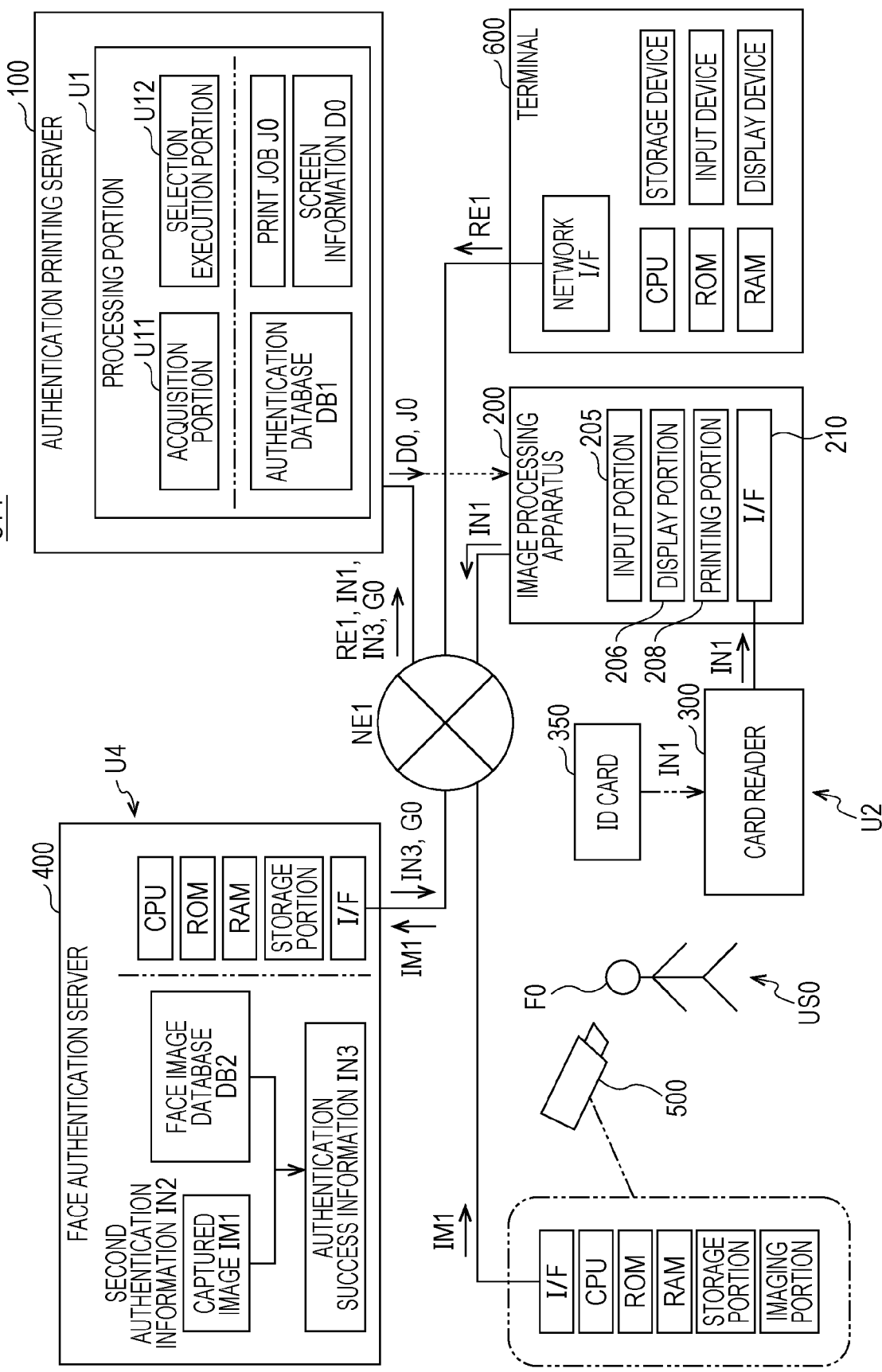
FIG. 1 is a block diagram schematically illustrating a configuration example of a system including a processing system.

Hereinafter, embodiments of the present disclosure will be described. As a matter of course, the following embodiments merely illustrate the present disclosure, and not all features illustrated in the embodiments are essential to solution units of the disclosure.

(1) Overview of Technique Included in Present Disclosure

First, an overview of a technique included in the present disclosure will be described with reference to examples illustrated in FIGS. 1 to 14. The figures of the present application are diagrams schematically illustrating the examples, and the magnification in each direction illustrated in these figures may be different and the figures may not be consistent. As a matter of course, each element of the present technique is not limited to specific examples indicated by reference numerals. In the "overview of the technique included in the present disclosure", the words in parentheses mean supplementary explanations of the immediately preceding words.

Aspect 1:

As illustrated in FIGS. 1, 7, 12, and 14, a processing system SY1 according to an aspect of the present technique is the processing system SY1 that permits an authenticated user US0 to use an image processing apparatus 200 having a plurality of types of processing functions 800 and provided with an operation portion 205, and includes a reading portion U2 and a processing portion U1. The reading portion U2 reads first authentication information IN1 from a recording medium (for example, ID card 350) on which the first authentication information IN1 is recorded on a readable manner. The processing portion U1 can acquire authentication success information IN3 indicating that authentication is performed based on second authentication information IN2 different from the first authentication information IN1 without touching the operation portion 205, and causes the image processing apparatus 200 to execute the plurality of types of processing functions 800. The processing portion U1 selects a target processing function 810 from the plurality of types of processing functions 800 based on a reading state of the first authentication information IN1 by the reading portion U2, and causes the image processing apparatus 200 to execute the target processing function 810 when the authentication success information IN3 is acquired.

The user US0 can select the target processing function 810 to be executed by the image processing apparatus 200 based on the state where the first authentication information IN1 recorded on a recording medium (350) is read by the reading portion U2. When authentication is performed based on the second authentication information IN2 without touching the operation portion 205 of the image processing apparatus 200, the image processing apparatus 200 executes the selected target processing function 810. Therefore, Aspect 1 above can provide the processing system SY1 that causes the image processing apparatus 200 to execute the desired processing function 800 without touching the operation portion 205 of the image processing apparatus 200.

Here, the processing functions 800 includes functions such as printing, document reading, document copying, facsimile communication, and the like. The image processing apparatus 200 may be a multifunction machine having two or more functions of a plurality of functions including a printing function 801, a document reading function, a copying function, a facsimile function, and the like.

The authentication based on the second authentication information IN2 includes face authentication based on a captured image of the face of the user US0, iris authentication based on a captured image of the iris of the user US0, and the like. Therefore, the second authentication information IN2 includes a captured image of the face, a captured image of the iris, and the like. When authentication is performed based on the second authentication information IN2 obtained by detecting the user US0 without contact, such as face authentication, iris authentication, and the like, the user US0 can cause the image processing apparatus 200 to execute the processing function 800 without touching the device for authentication.

The processing system SY1 may include an authentication portion U4 that performs authentication based on the second authentication information IN2.

The reading state of the first authentication information IN1 by the reading portion U2 includes the number i of times the first authentication information IN1 is read by the reading portion U2, the position where the first authentication information IN1 is read by the reading portion U2, the reading interval of the first authentication information IN1 by the reading portion U2, and the like.

"First", "second", . . . in the present application are terms for identifying each component included in a plurality of components having similarities, and do not mean the order.

The additional remark described above also applies to the following aspects.

Figure 6:
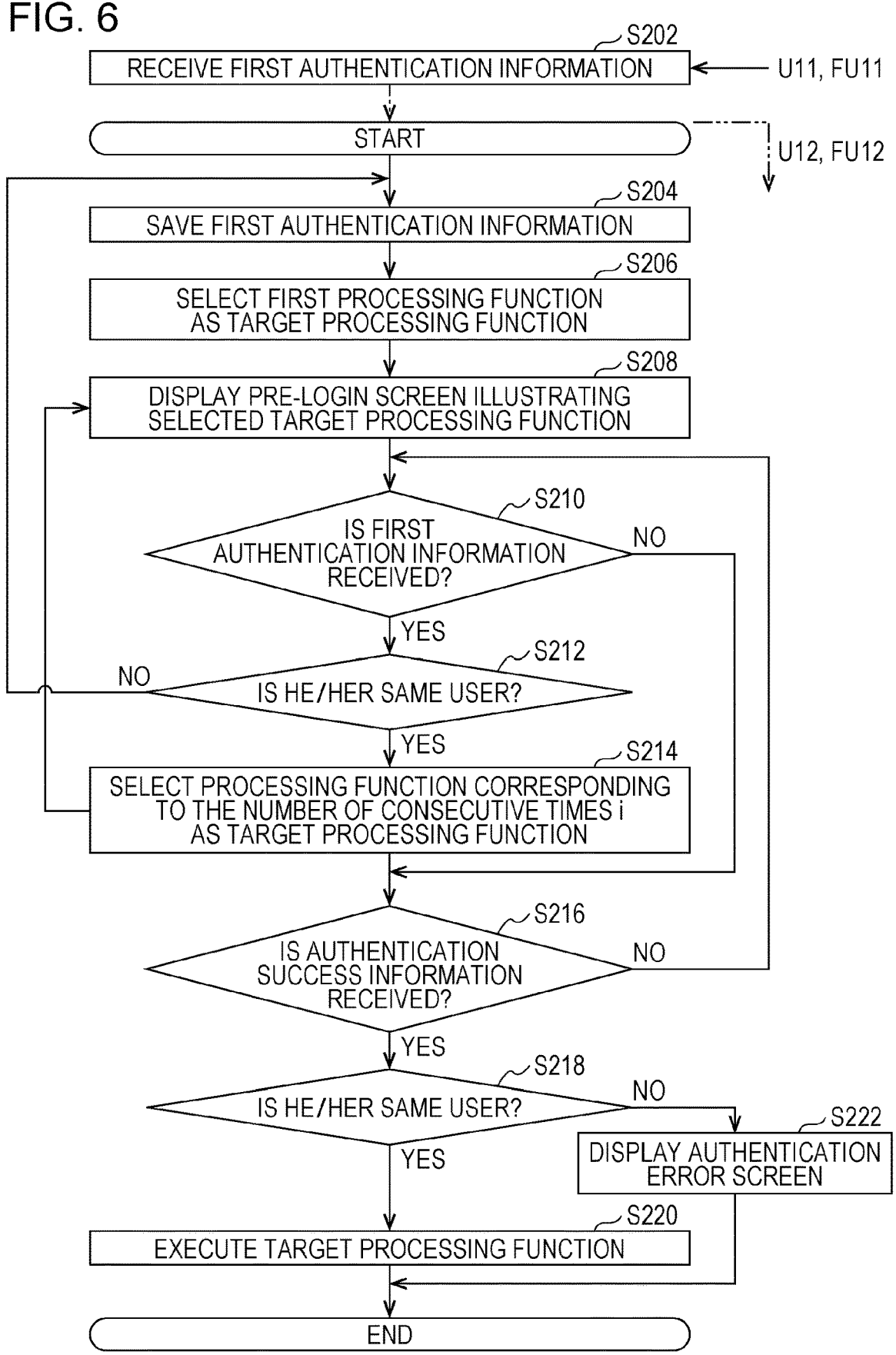
FIG. 6 is a flowchart schematically illustrating an example of processing performed by a selection execution portion.

Aspect 2:

The first authentication information IN1 may be associated with the user US0. As illustrated in FIG. 6, when the authentication success information IN3 based on the second authentication information IN2 associated with the user US0 is acquired, the processing portion U1 may cause the image processing apparatus 200 to execute the target processing function 810.

In the above case, when the user US0 associated with the first authentication information IN1 recorded on the recording medium (350) does not match the user US0 associated with the second authentication information IN2, the target processing function 810 is not executed. Therefore, Aspect 2 above can provide the processing system SY1 that enhances the effect of suppressing impersonating, in which an unauthorized user illegally uses the recording medium (350) or the second authentication information IN2 to log in.

Figure 5:
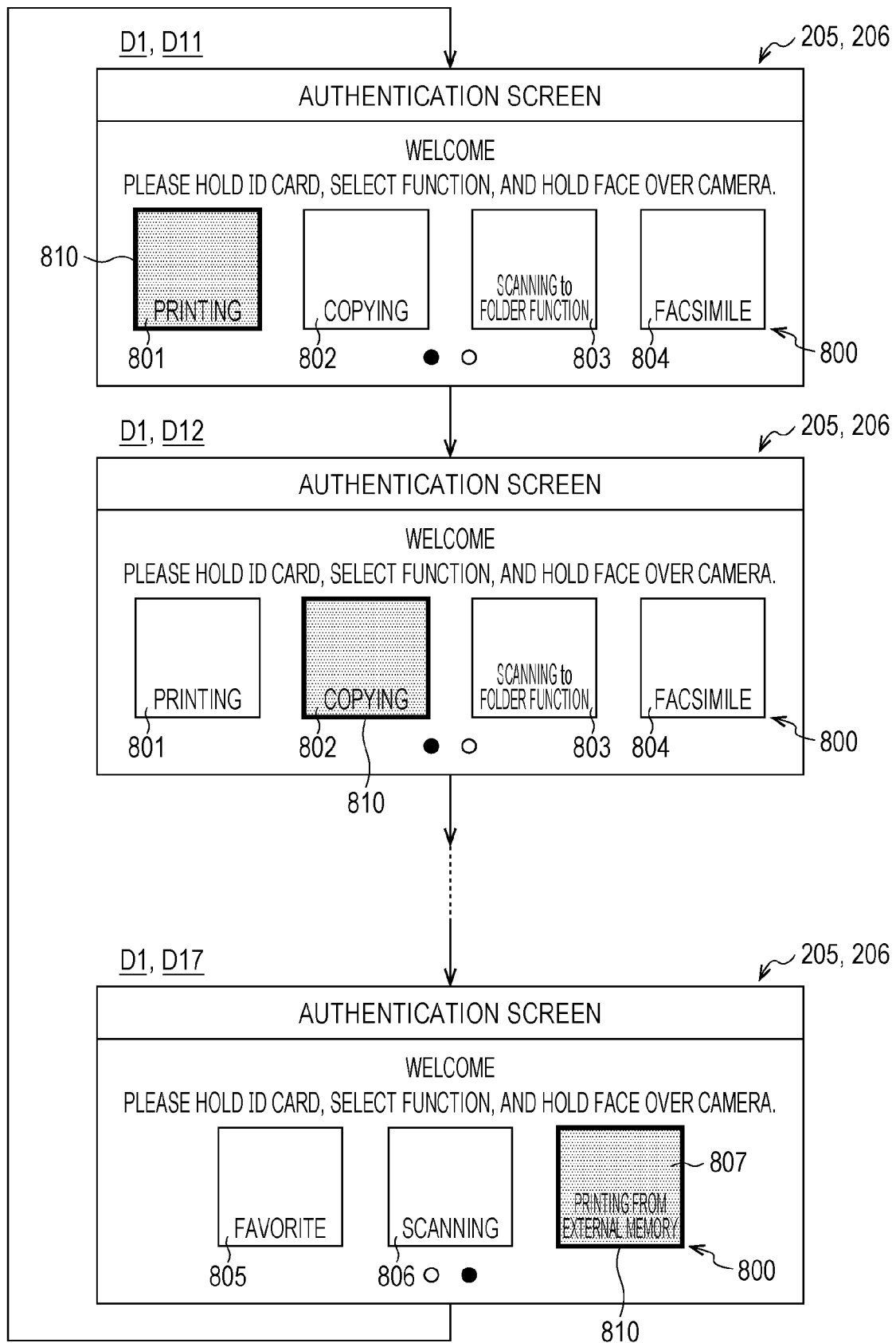
FIG. 5 is a diagram schematically illustrating a change example of a pre-login screen.

Aspect 3:

As illustrated in FIGS. 5 and 6, the processing portion U1 may select the target processing function 810 from the plurality of types of processing functions 800 based on the number i of times the first authentication information IN1 is read by the reading portion U2.

In the above case, the user US0 can select the target processing function 810 to be executed by the image processing apparatus 200 based on the number i of times the recording medium (350) is read by the reading portion U2. Therefore, Aspect 3 above can provide a suitable processing system SY1 that causes the image processing apparatus 200 to execute the desired processing function 800.

Aspect 4:

As illustrated in FIGS. 5 and 6, the processing portion U1 may switch the target processing function 810 among the plurality of types of processing functions 800 when the first authentication information IN1 is read by the reading portion U2.

In the above case, the user US0 can switch the processing function 800 to be executed by the image processing apparatus 200 by causing the reading portion U2 to read the recording medium (350). Therefore, Aspect 4 above can provide a suitable processing system SY1 that causes the image processing apparatus 200 to execute the desired processing function 800.

Aspect 5:

As illustrated in FIG. 6, when the first authentication information IN1 is continuously read by the reading portion U2, the processing portion U1 may switch the target processing function 810 among the plurality of types of processing functions 800 in a case in which the user US0 is associated with the first authentication information IN1 read this time and the first authentication information IN1 read last time. In the above case, the user US0 can switch the processing function 800 to be executed by the image processing apparatus 200 by causing the reading portion U2 to continuously read the recording medium (350). Therefore, Aspect 5 above can provide a suitable processing system SY1 that causes the image processing apparatus 200 to execute the desired processing function 800.

Figure 7:
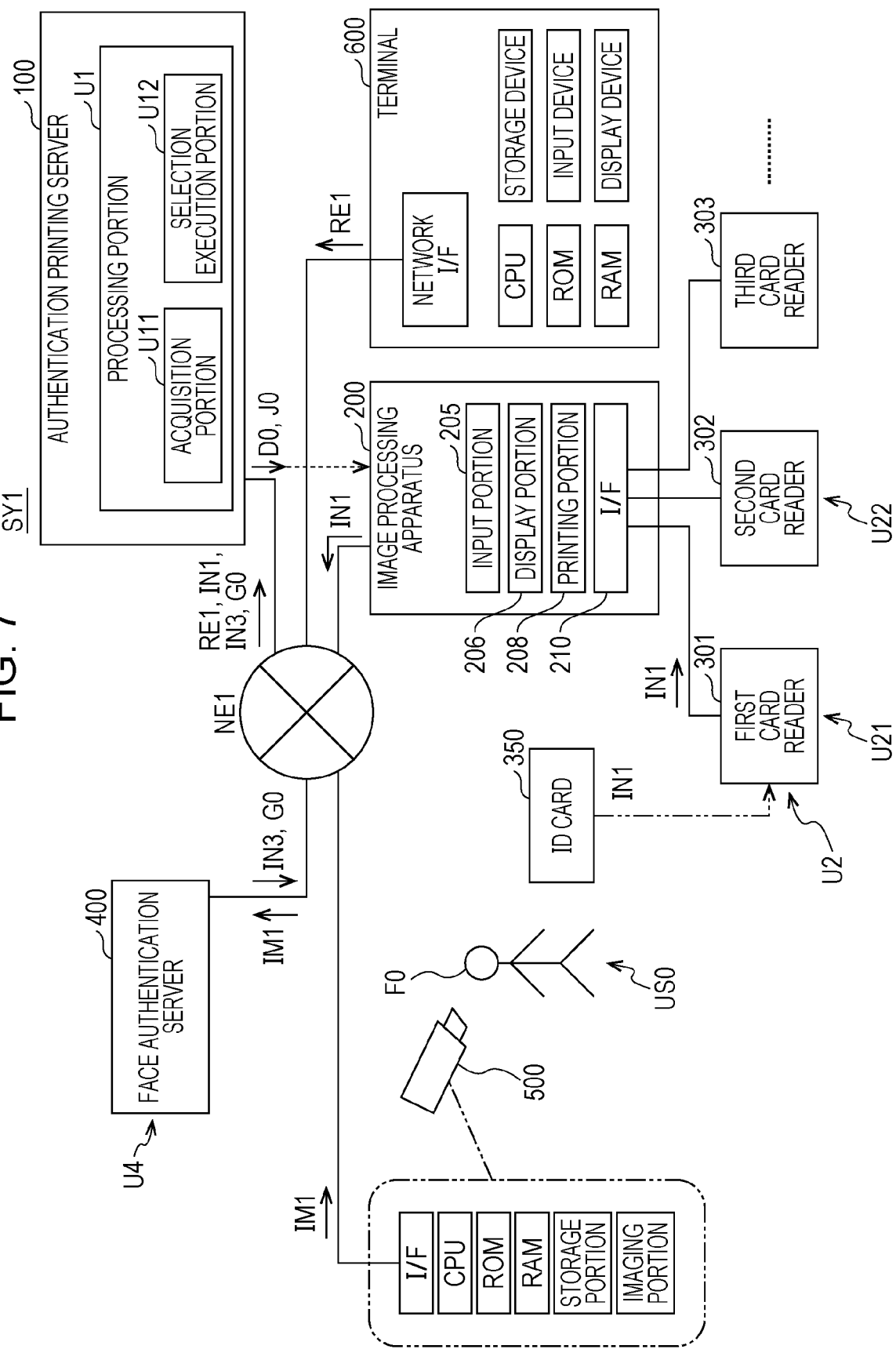
FIG. 7 is a block diagram schematically illustrating a configuration example of a system including a processing system configured such that a reading portion includes a plurality of information processing portions.
Figure 8:
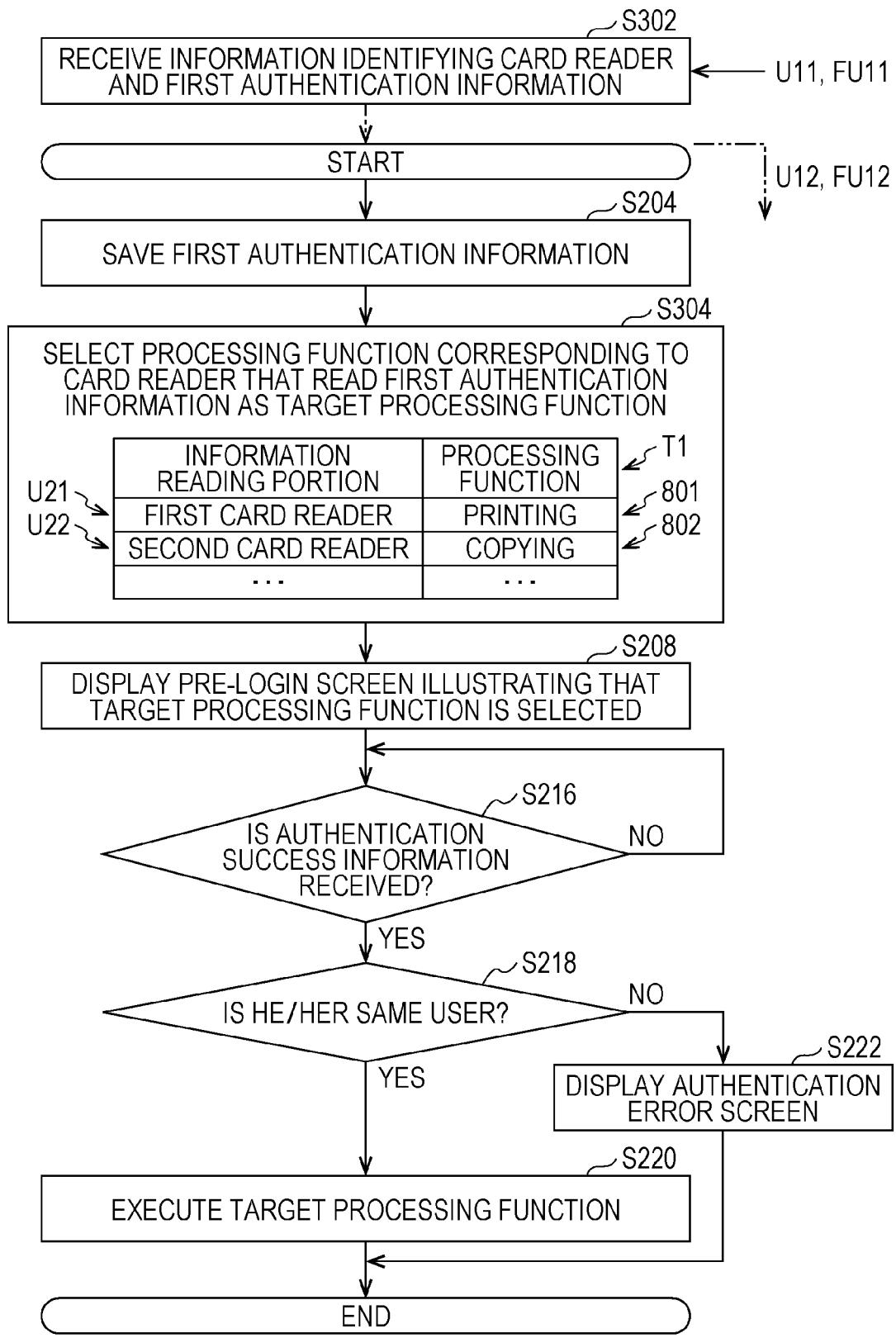
FIG. 8 is a flowchart schematically illustrating an example of processing performed by the selection execution portion when the reading portion includes the plurality of information processing portions.

Aspect 6:

As illustrated in FIG. 7, the reading portion U2 may include a first information reading portion U21 that reads the first authentication information IN1 from the recording medium (350), and a second information reading portion U22 that reads the first authentication information IN1 from the recording medium (350) separately from the first information reading portion U21. As illustrated in FIG. 8, the plurality of types of processing functions 800 may include a first processing function (for example, printing function 801) and a second processing function (for example, copying function 802) different from the first processing function (801). The processing portion U1 may select the first processing function (801) as the target processing function 810 when the first authentication information IN1 is read by the first information reading portion U21, and select the second processing function (802) as the target processing function 810 when the first authentication information IN1 is read by the second information reading portion U22.

In the above case, the user US0 can select different target processing functions 810 according to the information reading portion that reads the recording medium (350). Therefore, Aspect 6 above can provide a suitable processing system SY1 that causes the image processing apparatus 200 to execute the desired processing function 800.

Figure 3:
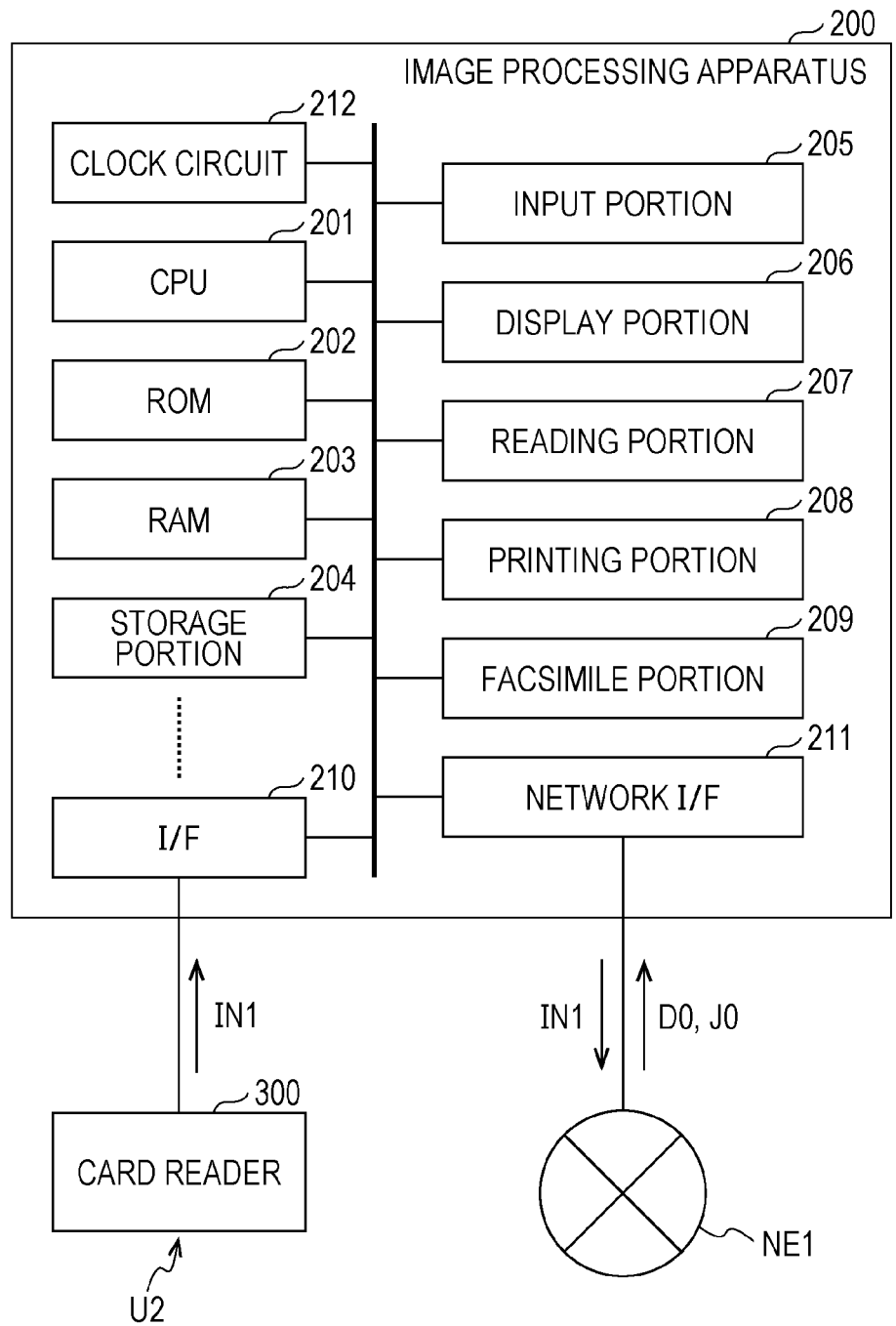
FIG. 3 is a block diagram schematically illustrating a configuration example of an image processing apparatus.

Aspect 7:

As illustrated in FIG. 3 and the like, the image processing apparatus 200 may be capable of printing. As illustrated in FIG. 5 and the like, the plurality of types of processing functions 800 may include the printing function 801. As illustrated in FIG. 1 and the like, the processing portion U1 may hold the print job J0 associated with the user US0. When the printing function 801 is selected from the plurality of types of processing functions 800 and the authentication success information IN3 is acquired, the processing portion U1 may cause the image processing apparatus 200 to execute the printing function 801 based on the print job J0.

Aspect 7 above can provide the processing system SY1 that causes the image processing apparatus 200 to execute the printing function 801 without touching the operation portion 205 of the image processing apparatus 200.

Figure 9:
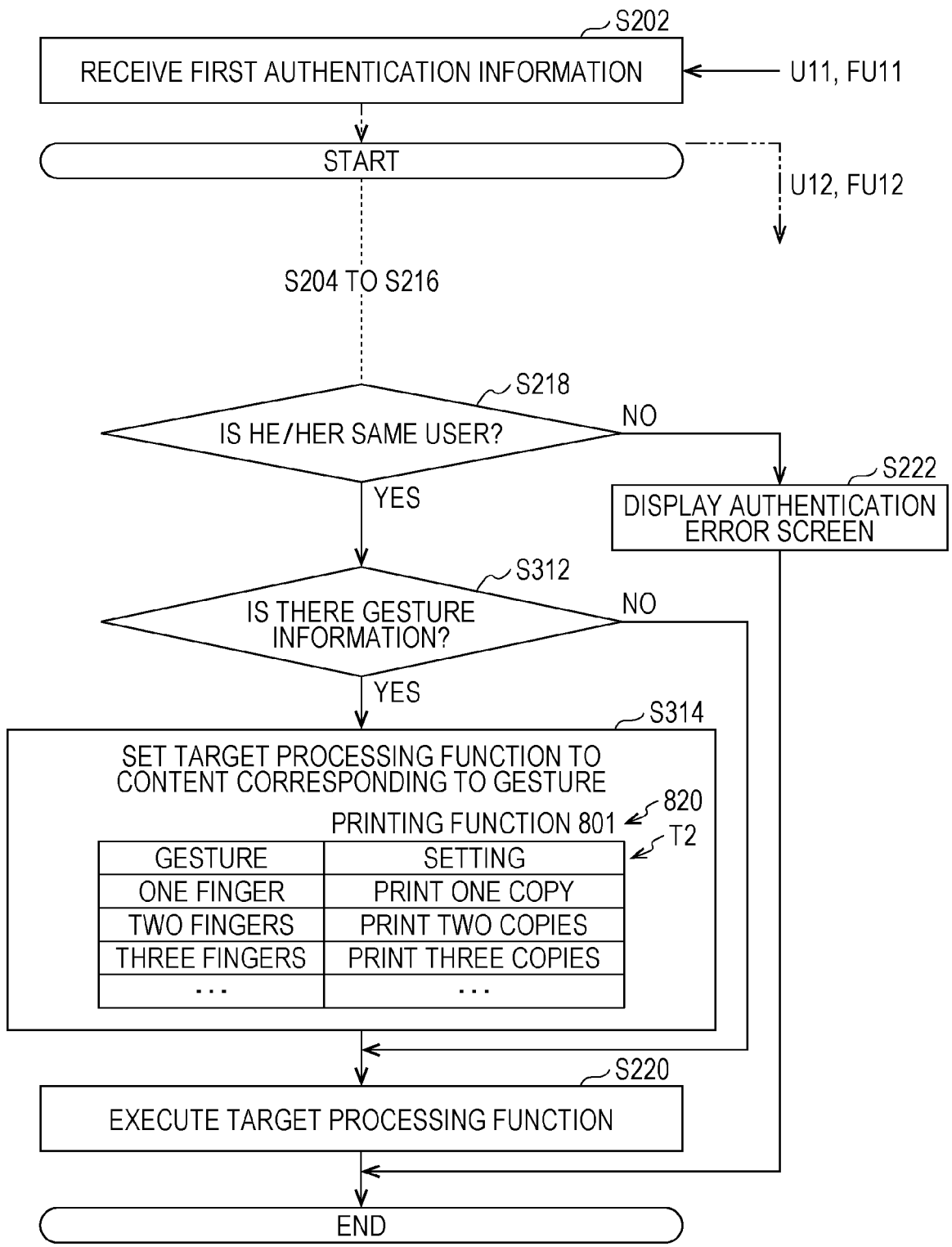
FIG. 9 is a flowchart schematically illustrating an example of processing performed by the selection execution portion when gesture information corresponding to the content of setting of a processing function with setting is acquired.

Aspect 8:

As illustrated in FIG. 9, the plurality of types of processing functions 800 may include a processing function with setting 820 that can change the content of setting. The processing portion U1 may acquire gesture information G0 indicating a gesture from a detection portion (for example, face authentication server 400) that detects the gesture which is the gesture of the user US0 and corresponds to the content of the setting. When the processing function with setting 820 is selected as the target processing function 810, the authentication success information IN3 is acquired, and the gesture information G0 is acquired, the processing portion U1 may cause the image processing apparatus 200 to execute the processing function with setting 820 set to the content corresponding to the gesture.

In the above case, the user US0 can cause the image processing apparatus 200 to execute the processing function with setting 820 set to the content corresponding to the gesture. Therefore, Aspect 8 above can provide the processing system SY1 that improves convenience.

Figure 10:
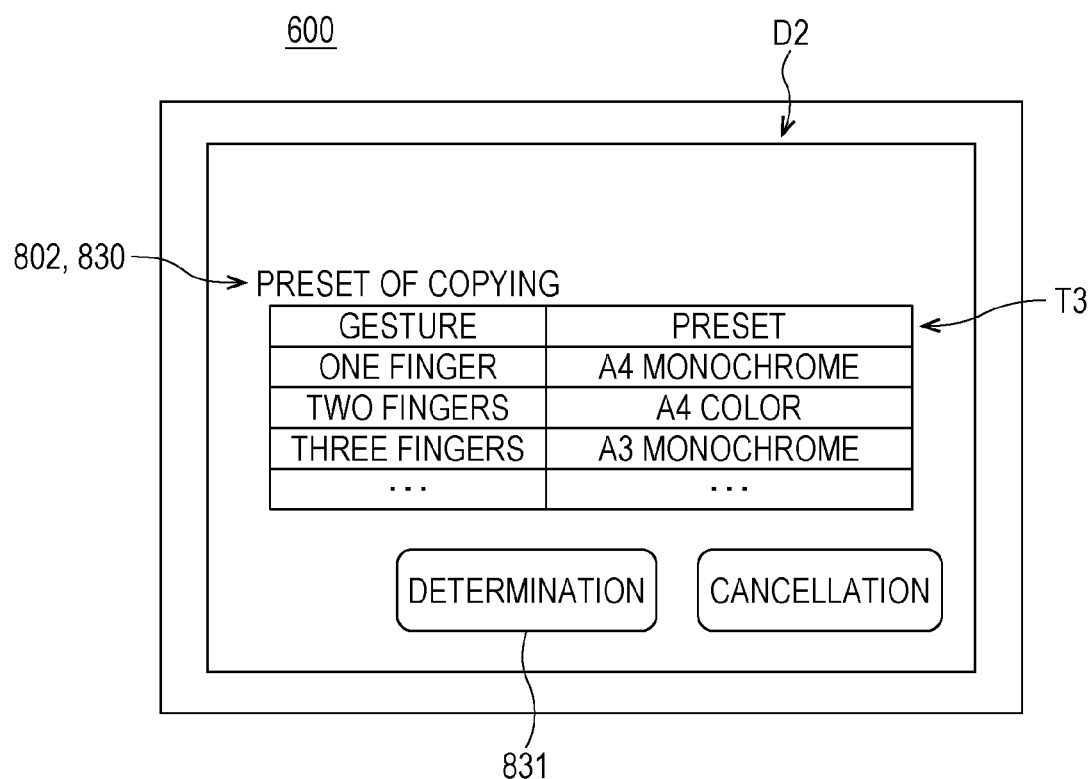
FIG. 10 is a diagram schematically illustrating an example of a preset screen displayed on a terminal.
Figure 11:
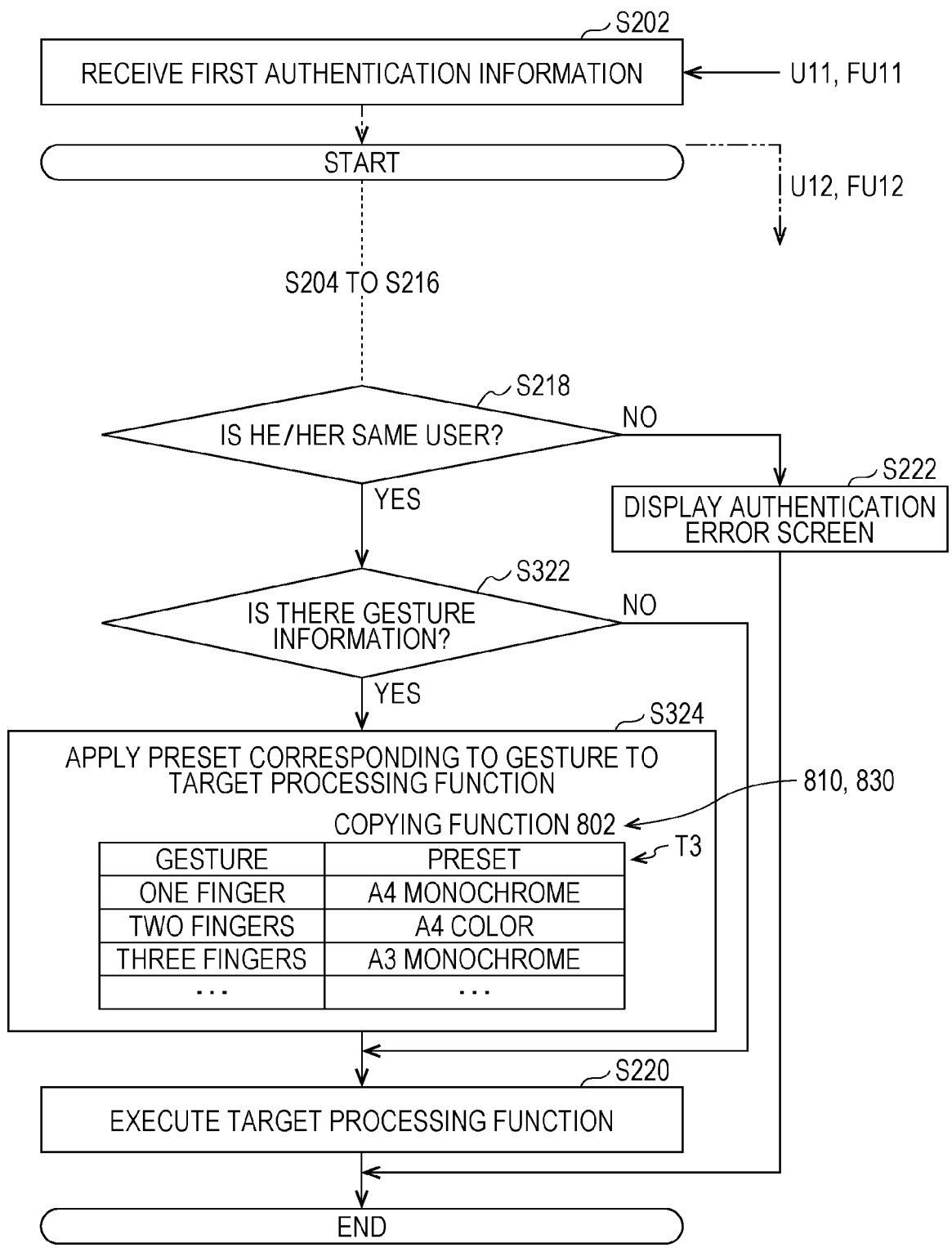
FIG. 11 is a flowchart schematically illustrating an example of processing performed by the selection execution portion when gesture information corresponding to presetting of a pre-settable processing function is acquired.

Aspect 9:

As illustrated in FIGS. 10 and 11, the plurality of types of processing functions 800 may include a pre-settable processing function 830 for which presets can be prepared. The processing portion U1 may acquire gesture information G0 indicating the gesture from the detection portion (400) that detects the gesture which is the gesture of the user US0 and corresponds to the preset. When the pre-settable processing function 830 is selected as the target processing function 810, the authentication success information IN3 is acquired, and the gesture information G0 is acquired, the processing portion U1 may cause the image processing apparatus 200 to execute the pre-settable processing function 830 according to the preset corresponding to the gesture.

In the above case, the user US0 can cause the image processing apparatus 200 to execute the pre-settable processing function 830 according to the preset corresponding to the gesture. Therefore, Aspect 9 above can provide the processing system SY1 that improves convenience.

Figure 12:
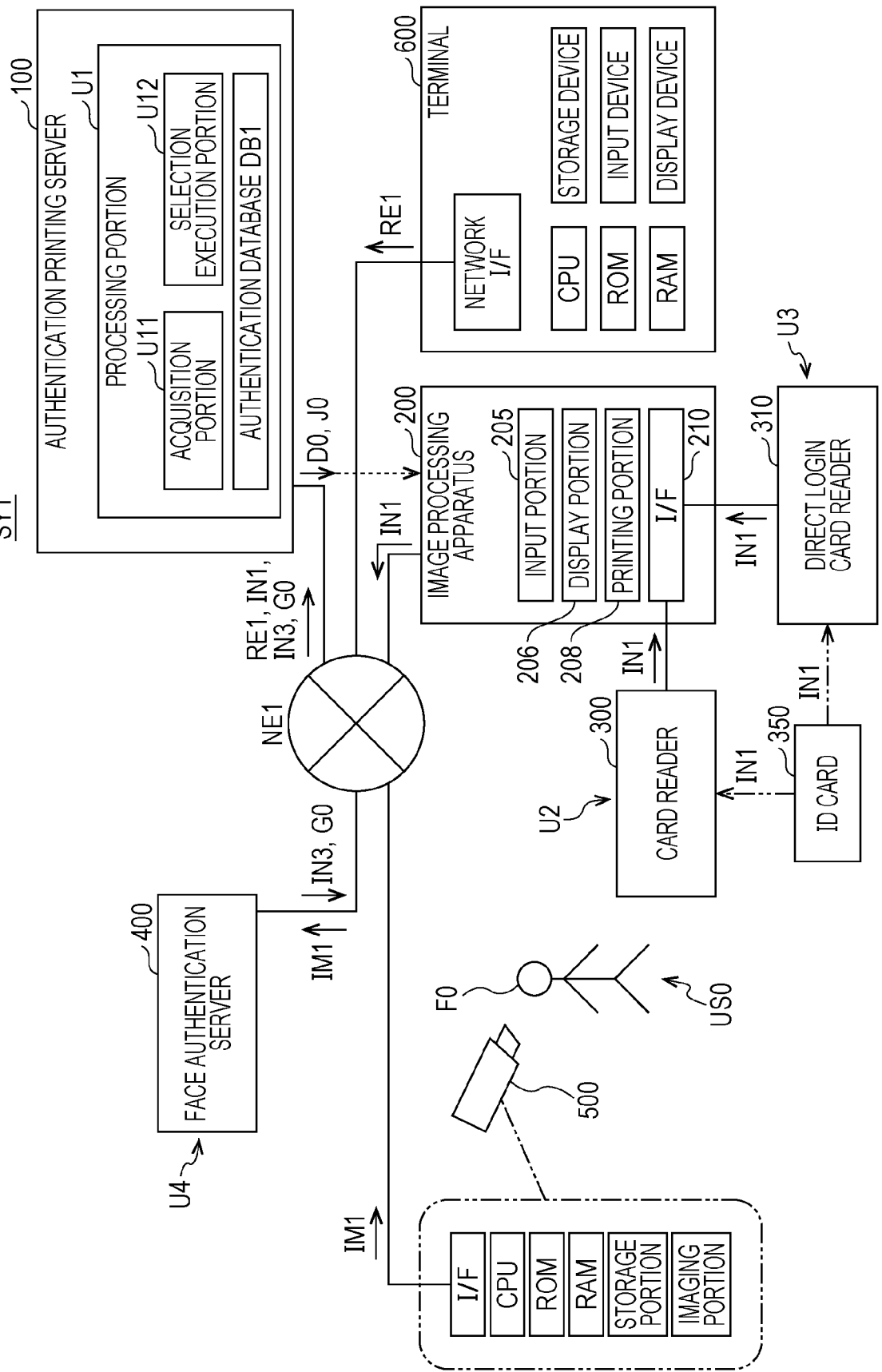
FIG. 12 is a block diagram schematically illustrating a configuration example of a system including a processing system provided with an authentication information reading portion.
Figure 13:
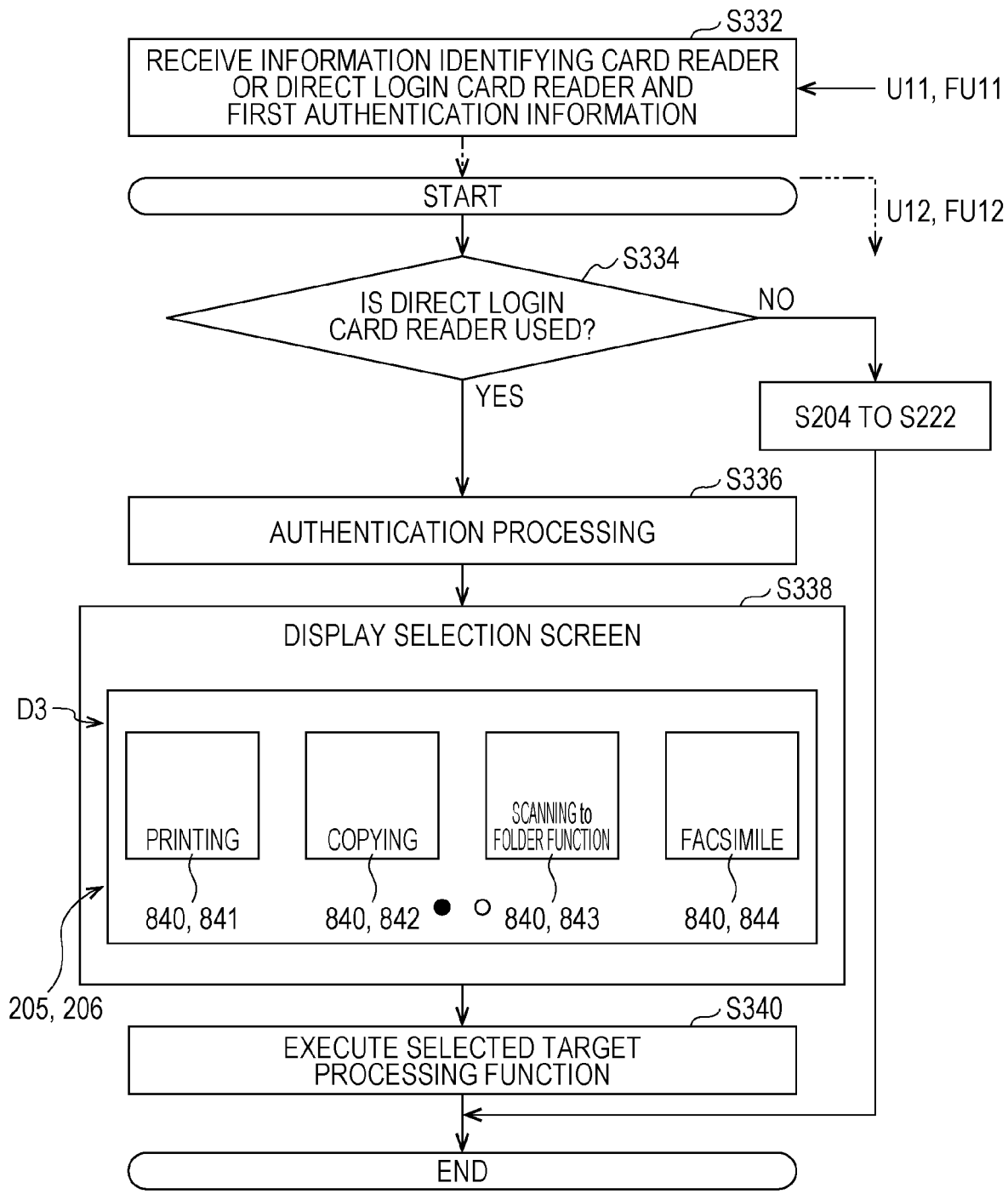
FIG. 13 is a flowchart schematically illustrating an example of processing performed by a selection execution portion when the processing system is provided with an authentication information reading portion.

Aspect 10:

As illustrated in FIGS. 3, 12, and the like, the image processing apparatus 200 may be provided with a display portion 206. As illustrated in FIG. 12, the processing system SY1 may further include an authentication information reading portion U3 that reads the first authentication information IN1 from the recording medium (350) separately from the reading portion U2. As illustrated in FIG. 13, when the first authentication information IN1 is read by the authentication information reading portion U3, the processing portion U1 may cause the display portion 206 to display a selection screen D3 for receiving selection of the target processing function 810 from the plurality of types of processing functions 800.

In the above case, the authentication information reading portion U3 is read the first authentication information IN1 recorded on the recording medium (350), so that the user US0 can select the processing function 800 to be executed in the image processing apparatus 200 according to the displayed selection screen D3. Therefore, Aspect 10 above can provide the processing system SY1 that improves convenience.

Aspect 11:

As illustrated in FIG. 1 and the like, the processing portion U1 and the image processing apparatus 200 may be connected to each other via a network NE1. The processing portion U1 may cause the image processing apparatus 200 to execute the target processing function 810 via the network NE1.

Aspect 11 above can perform advanced processing in a processing portion U1 network-connected to the image processing apparatus 200, and thus can provide a suitable example of the processing system SY1.

Figure 14:
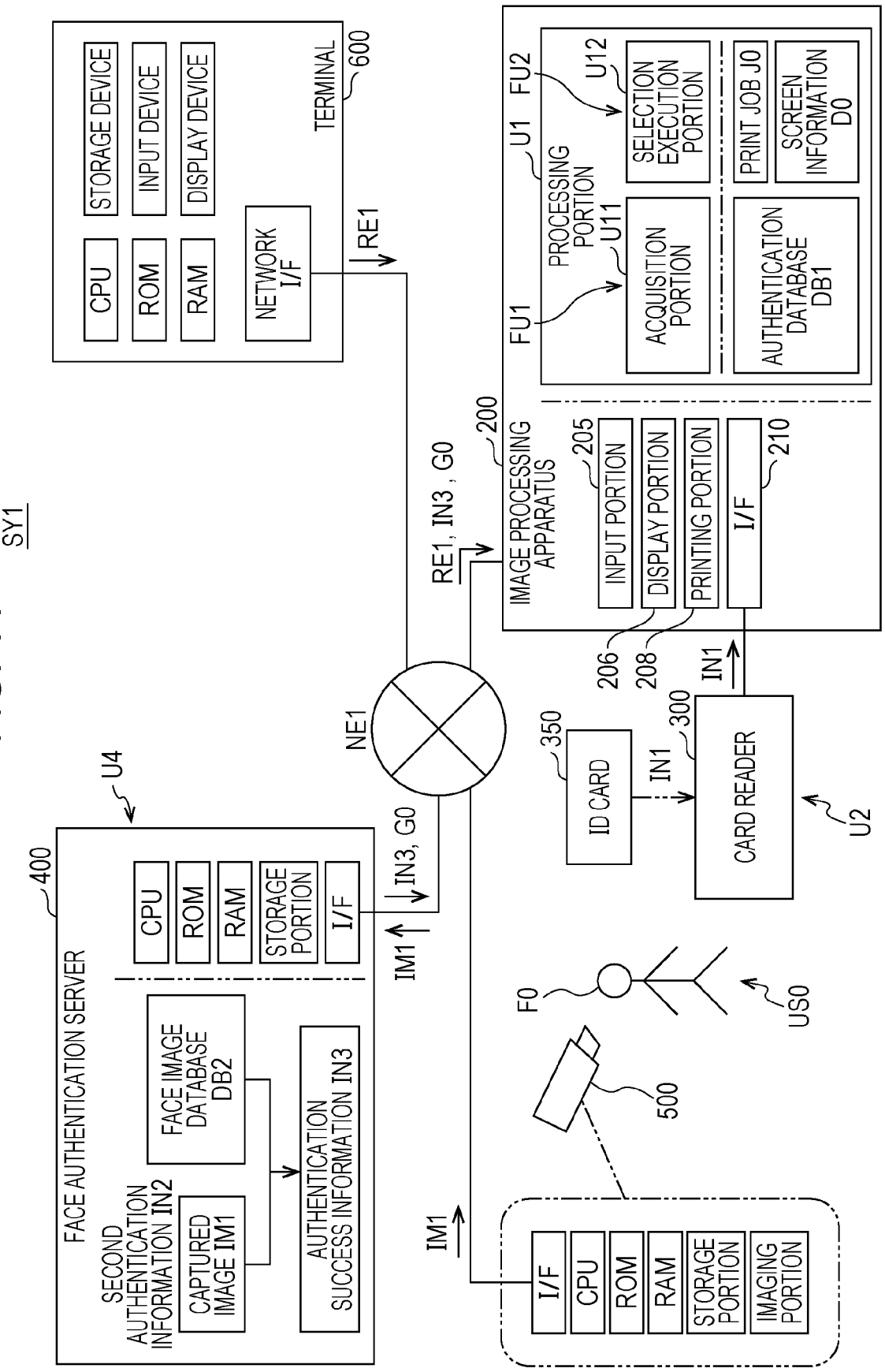
FIG. 14 is a block diagram schematically illustrating another configuration example of the system including the processing system.

Aspect 12:

As illustrated in FIG. 14, the processing portion U1 may be included in the image processing apparatus 200.

Aspect 12 above can provide a processing system SY1 that does not require a server that manages the image processing apparatus 200.

Figure 2:
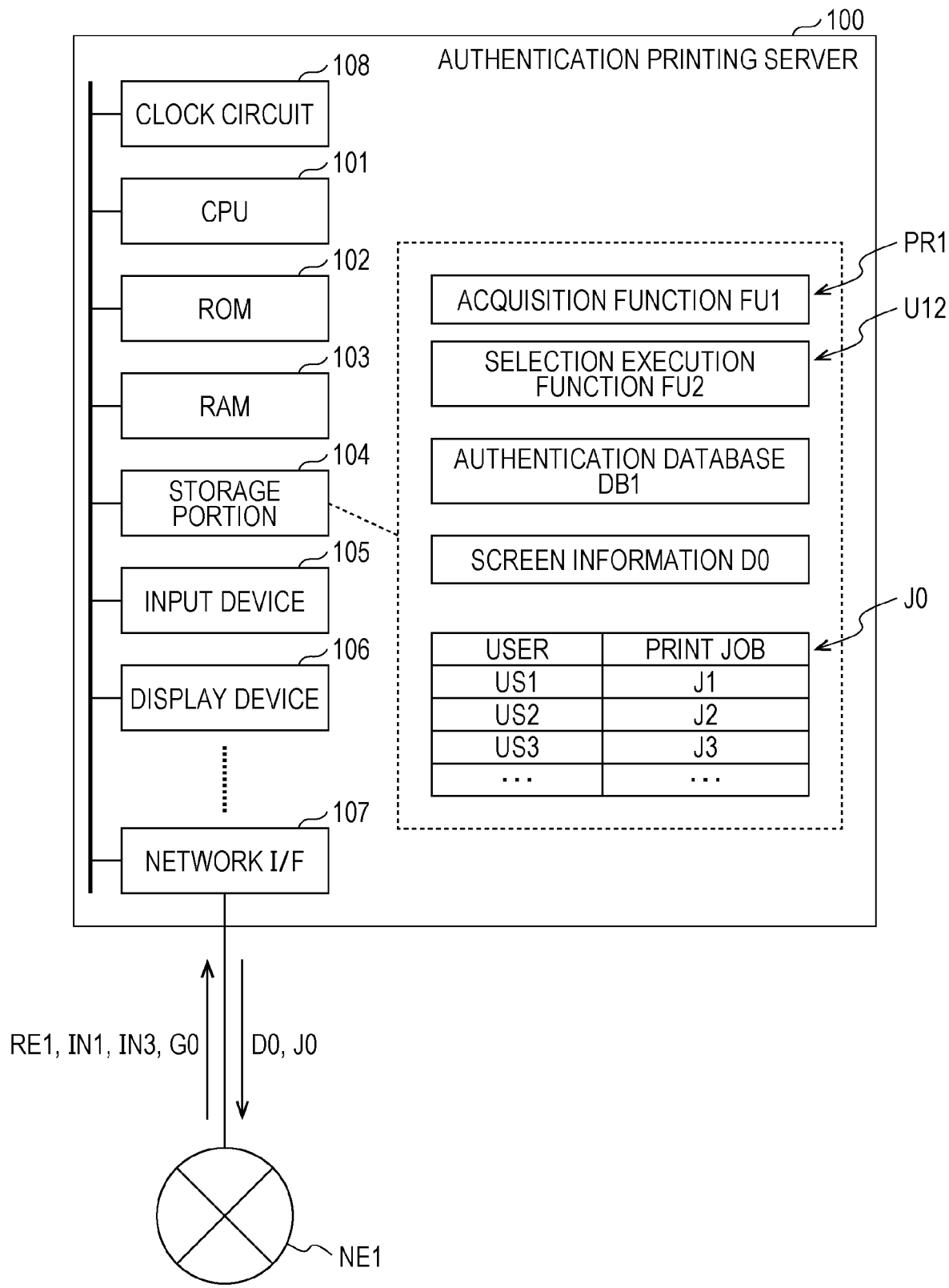
FIG. 2 is a block diagram schematically illustrating a configuration example of an information processing apparatus.

Aspect 13:

Incidentally, as illustrated in FIGS. 1, 2, and the like, an information processing apparatus (for example, authentication printing server 100) according to an aspect of the present technique is the information processing apparatus (100) coupled to the image processing apparatus 200 having the plurality of types of processing functions 800 and provided with the operation portion 205, and includes the acquisition portion U11 and the selection execution portion U12. The acquisition portion U11 can acquire the first authentication information IN1 read by the reading portion U2 from the recording medium (350) on which the first authentication information IN1 is recorded in a readable manner, and can acquire the authentication success information IN3 indicating that authentication is performed based on the second authentication information IN2 different from the first authentication information IN1 without touching the operation portion 205. The selection execution portion U12 selects the target processing function 810 from the plurality of types of processing functions 800 based on the reading state of the first authentication information IN1 by the reading portion U2, and causes the image processing apparatus 200 to execute the target processing function 810 when the authentication success information IN3 is acquired by the acquisition portion U11.

Aspect 13 above can provide the information processing apparatus (100) that causes the image processing apparatus 200 to execute the desired processing function 800 without touching the operation portion 205 of the image processing apparatus 200.

Aspect 14:

In addition, as illustrated in FIGS. 2 and 14, the control program PR1 according to an aspect of the present technique is the control program PR1 for permitting the authenticated user US0 to use the image processing apparatus 200 having the plurality of types of processing functions 800 and provided with the operation portion 205, and causes the computer to realize an acquisition function FU1 and a selection execution function FU2. The acquisition function FU1 can acquire the first authentication information IN1 read by the reading portion U2 from the recording medium (350) on which the first authentication information IN1 is recorded in a readable manner, and can acquire the authentication success information IN3 indicating that authentication is performed based on the second authentication information IN2 different from the first authentication information IN1 without touching the operation portion 205. The selection execution function FU2 selects the target processing function 810 from the plurality of types of processing functions 800 based on the reading state of the first authentication information IN1 by the reading portion U2, and causes the image processing apparatus 200 to execute the target processing function 810 when the authentication success information IN3 is acquired by the acquisition portion U11.

Aspect 14 above can provide the control program PR1 for causing the image processing apparatus 200 to execute the desired processing function 800 without touching the operation portion 205 of the image processing apparatus 200.

Aspect 15:

Furthermore, as illustrated in FIG. 14, the image processing apparatus 200 according to an aspect of the present technique is the image processing apparatus 200 having the plurality of types of processing functions 800, and includes the operation portion 205, the acquisition portion U11, and the selection execution portion U12. The acquisition portion U11 can acquire the first authentication information IN1 read by the reading portion U2 from the recording medium (350) on which the first authentication information IN1 is recorded in a readable manner, and can acquire the authentication success information IN3 indicating that authentication is performed based on the second authentication information IN2 different from the first authentication information IN1 without touching the operation portion 205. The selection execution portion U12 selects a target processing function 810 from the plurality of types of processing functions 800 based on the reading state of the first authentication information IN1 by the reading portion U2, and executes the target processing function 810 when the authentication success information IN3 is acquired by the acquisition portion U11.

Aspect 15 above can provide the image processing apparatus 200 that causes the desired processing function 800 to be executed without touching the operation portion 205.

Furthermore, the present technique can be applied to a complex system including the processing system SY1, a complex apparatus including the information processing apparatus (100), an image processing system including the image processing apparatus 200, a processing method performed by the processing system SY1, an information processing method performed by the information processing apparatus (100), a processing method performed by the image processing apparatus 200, a control method of the image processing apparatus 200, a computer-readable medium recording the control program PR1, and the like. Any of the apparatuses described above may be configured to include a plurality of distributed parts.

(2) Specific Example of Configuration of Processing System

FIG. 1 schematically illustrates the configuration of a system including a processing system SY1 as a specific example. The system includes the authentication printing server 100, the image processing apparatus 200, the card reader 300, the face authentication server 400, the imaging device 500, and the terminal 600. Here, the authentication printing server 100 is an example of an information processing apparatus, the card reader 300 is an example of the reading portion U2, and the face authentication server 400 is an example of the authentication portion U4 and the detection portion. The processing system SY1 includes an authentication printing server 100, an image processing apparatus 200, and a card reader 300. The processing system SY1 may include the terminal 600, may include the face authentication server 400, or may include the imaging device 500. The authentication printing server 100, the image processing apparatus 200, the face authentication server 400, the imaging device 500, and the terminal 600 are connected to a network NE1 including the Internet. The network NE1 may include a LAN. Here, LAN is an abbreviation for Local Area Network. The connection to the network NE1 may be a wired connection, a wireless connection, or both a wired and wireless connection.

The image processing apparatus 200 can execute the plurality of types of processing functions 800 illustrated in FIG. 5. For example, the user US0 can use the printing function 801 as the processing function 800 by registering the print job J0 in the authentication printing server 100. By using the terminal 600, the user US0 can cause the authentication printing server 100 to hold the print job J0. The terminal 600 includes a computer such as a personal computer including a tablet terminal, a mobile phone such as a smart phone, and the like. In addition, the user US0 can select the printing function 801 as the target processing function 810 by performing a holding operation of the ID card 350 over the card reader 300. Moreover, when the user US0 faces a face F0 toward the imaging device 500 to succeed in face authentication, the user US0 can cause the image processing apparatus 200 to execute printing based on the print job J0 registered in the authentication printing server 100. Here, ID is an abbreviation for identification, and the ID card 350 is an example of a recording medium on which the first authentication information IN1 is recorded in a readable manner. In addition, the user US0 can cause the image processing apparatus 200 to execute the processing functions 800 such as a document reading function, a copying function, a facsimile function, and the like.

The combination of the image processing apparatus 200, the card reader 300, and the imaging device 500 is not limited to one existing in the processing system SY1, and two or more combinations may exist in the processing system SY1. In addition, two or more terminals 600 may exist in the processing system SY1.

The authentication printing server 100 as an information processing apparatus is a server computer including a processing portion U1 that causes the image processing apparatus 200 to execute the plurality of types of processing functions 800. The processing portion U1 includes the acquisition portion U11 and the selection execution portion U12. The acquisition portion U11 can acquire the first authentication information IN1 including information identifying the user US0 from the image processing apparatus 200 via the network NE1. In addition, the acquisition portion U11 can acquire the authentication success information IN3 including information identifying the user US0 from the face authentication server 400 via the network NE1. When the image processing apparatus 200 has the printing function 801, the acquisition portion U11 can acquire a print job registration request RE1 including information identifying the user US0 from the terminal 600 via the network NE1. When the face authentication server 400 generates gesture information G0 indicating the gesture of the user US0, the acquisition portion U11 can acquire the gesture information G0 including information identifying the user US0 from the face authentication server 400 via the network NE1. The selection execution portion U12 holds screen information D0 for displaying a screen such as the pre-login screen D1 illustrated in FIG. 5 on the display portion 206 of the image processing apparatus 200, and transmits the screen information D0 according to the scene to the image processing apparatus 200. The selection execution portion U12 causes the image processing apparatus 200 to execute the target processing function 810 selected from the plurality of types of processing functions 800 based on the reading state of the first authentication information IN1 by the card reader 300.

In addition, the processing portion U1 has an authentication database DB1 that accumulates information that can permit authentication. When the first authentication information IN1 received from the image processing apparatus 200 via the network NE1 is registered in the authentication database DB1, and the authentication success information IN3 is associated with the user US0 associated with the first authentication information IN1, the processing portion U1 permits the login of the user US0.

The image processing apparatus 200 is provided with an operation portion 205, a display portion 206, a printing portion 208, an I/F 210 of the card reader 300, and the like. Here, I/F is an abbreviation for interface. The image processing apparatus 200 may be a multifunction machine as illustrated in FIG. 3. The multifunction machine can be said to be a printing device that includes a processing function 800 other than the printing function 801.

When the first authentication information IN1 is acquired from the card reader 300, the image processing apparatus 200 transmits the first authentication information IN1 to the authentication printing server 100 via the network NE1. In addition, when the screen information D0 is received from the authentication printing server 100 via the network NE1, the image processing apparatus 200 displays a screen according to the screen information D0 on the display portion 206. Furthermore, when the print job J0 is received from the authentication printing server 100 via the network NE1, the image processing apparatus 200 executes printing in the printing portion 208 according to the print job J0.

When the ID card 350 on which the first authentication information IN1 is recorded on a computer-readable manner is held, the card reader 300 as the reading portion U2 reads the first authentication information IN1 from the ID card 350, and transmits the first authentication information IN1 to the image processing apparatus 200. The first authentication information IN1 recorded on the ID card 350 is associated with the user US0 who owns the ID card 350. An IC card, a magnetic card, a card printed with an identification code including the first authentication information IN1, or the like can be used as the ID card 350. Here, IC is an abbreviation for Integrated Circuit. The identification codes include barcodes, two-dimensional codes, and the like. The card reader 300 includes an IC card reader, a magnetic card reader, an identification code reader, and the like. The card reader 300 may have the function of a writer capable of writing information. The card reader 300 may be directly coupled to the authentication printing server 100 instead of the image processing apparatus 200, or may be connected to the network NE1 when having a function as a web server.

In addition, the recording medium on which the first authentication information IN1 is recorded in a readable manner is not limited to the ID card 350, and may be an electronic device such as a smart phone that stores the first authentication information IN1. The reading portion U2 that reads the first authentication information IN1 from the electronic device may be the card reader 300, or may be a dedicated device different from the card reader 300.

The face authentication server 400 as the authentication portion U4 is a server computer including a CPU, a ROM, a RAM, a storage portion, an I/F for connecting to the network NE1, and the like. Here, CPU is an abbreviation for Central Processing Unit, ROM is an abbreviation for Read Only Memory, and RAM is an abbreviation for Random Access Memory. The storage portion of the face authentication server 400 stores a face image database DB2 in which the feature amounts of the face images of the user US0 that can permit authentication are associated with the user US0 and accumulated.

The face authentication processing is performed by determining the validity of a person to be authenticated based on the result of comparison between the feature amount of the face image registered in advance and the feature amount of the face image of the person to be authenticated at the time of authentication. Various processing are considered for the face authentication processing. For example, as the face authentication processing, the face authentication server 400 may detect the facial part of each of the captured face image of the user US0 and the registered face image, detect each facial feature point based on the detected facial part, and calculate a degree of similarity of the facial parts based on the detected facial feature point. When the calculated degree of similarity is greater than a predetermined threshold, it is determined that the user US0 in the captured face image and the person in the registered face image are the same person.

For example, the facial part can be detected by using a method of discriminating between a face and a non-face using a support vector machine for each of the captured face image of the user US0 and the registered face image. In addition, the facial part can also be detected by using a method for discriminating between a face and a non-face by a method of a deep neural network, a general learning vector quantization method, or the like.

For example, the facial feature point can be detected by a method of extracting feature points such as the eyes, nose, mouth, and the like from a facial part, calculating the positional relationship of the feature points and predetermined characteristics in the vicinity of the feature points as feature amounts, and creating feature amount vectors. Here, the predetermined characteristics include shade of color, distribution of color, and the like. As a matter of course, facial feature points can also be detected by other methods.

For example, calculation of the degree of similarity of facial parts can be realized by a method of calculating a chi-square distance, a Euclidean distance, or the like between feature amount vectors for each of the captured face image of the user and the registered face image. As a matter of course, the degree of similarity of facial parts can also be calculated by other methods.

When a feature amount having a degree of similarity to the feature amount of the face image included in the captured image IM1 received from the imaging device 500 via the network NE1 greater than a threshold is registered in the face image database DB2, the face authentication server 400 generates authentication success information IN3 including information identifying user US0. The captured image IM1 of the face of the user US0 is an example of the second authentication information IN2 obtained by detecting the user US0. The authentication success information IN3 is information indicating that authentication is performed without touching the operation portion 205 based on the second authentication information IN2 different from the first authentication information IN1. When authentication success information IN3 is generated, the face authentication server 400 transmits the authentication success information IN3 to the authentication printing server 100 via the network NE1. When a feature amount having a degree of similarity to the feature amount of the face image included in the captured image IM1 greater than a threshold is not registered in the face image database DB2, the face authentication server 400 may transmit authentication failure information to the authentication printing server 100 indicating that second authentication has not been performed.

In addition, the face authentication server 400 may generate gesture information G0 indicating the gesture of the user US0, and may transmit the gesture information G0 to the authentication printing server 100 via the network NE1.

The imaging device 500 illustrated in FIG. 1 is a network camera that functions as a web server, and is provided with a CPU, a ROM, a RAM, a storage portion, an imaging portion, an I/F for connecting to the network NE1, and the like. Therefore, the imaging device 500 can also be said to be a server computer. When the face of the user US0 is photographed without contact, the imaging device 500 transmits the captured image IM1 to the face authentication server 400 via the network NE1. The imaging device 500 may be directly coupled to the face authentication server 400 instead of the network camera. As a matter of course, the imaging device 500 can also capture the gesture of the user US0.

FIG. 2 schematically illustrates the configuration of an authentication printing server 100, which is an example of an information processing apparatus. The authentication printing server 100 is provided with a CPU 101 as a processor, a ROM 102 as a semiconductor memory, a RAM 103 as a semiconductor memory, a storage portion 104, an input device 105, a display device 106, a network I/F 107, a clock circuit 108, and the like. These elements are electrically coupled so that information can be input and output to and from each other.

The storage portion 104 stores an OS (not illustrated), a control program PR1, an authentication database DB1, screen information D0, a print job J0, and the like. Here, OS is an abbreviation for operating system. The storage portion 104 is a computer-readable medium recording the control program PR1. The control program PR1 may be recorded on a computer-readable external recording medium. The control program PR1 causes the authentication printing server 100 as a computer to realize an acquisition function FU1 such as the first authentication information IN1 and the authentication success information IN3, and the selection execution function FU2 for causing the image processing apparatus 200 to execute the processing function 800. The acquisition function FU1 and network I/F 107 constitute the acquisition portion U11 illustrated in FIG. 1. The selection execution function FU2 corresponds to the selection execution portion U12 illustrated in FIG. 1. Since the processing portion U1 includes the acquisition portion U11 and the selection execution portion U12, the processing portion U1 and the image processing apparatus 200 are connected to each other via the network NE1.

The print job J0 is stored on the storage portion 104 in association with the user US0. In the example illustrated in FIG. 2, it is indicated that the storage portion 104 stores a print job "J1" associated with a user "US1", a print job "J2" associated with a user "US2", and a print job "J3" associated with a user "US3".

A pointing device, a hard key including a keyboard, a touch panel attached to the surface of the display panel, or the like can be used for the input device 105. A liquid crystal display panel or the like can be used for the display device 106. The network I/F 107 is connected to the network NE1 and communicates with a counterpart device connected to the network NE1 according to a predetermined communication standard. For example, the network I/F 107 receives the print job registration request RE1, the first authentication information IN1, the authentication success information IN3, the gesture information G0, and the like from the counterpart device, and transmits the screen information D0, the print job J0, and the like to the image processing apparatus 200 as a counterpart device. The clock circuit 108 can output the current date and time.

The CPU 101 executes an acquisition processing corresponding to the acquisition function FU1 and a selection execution processing corresponding to the selection execution function FU2 by executing the control program PR1 read from the storage portion 104 to the RAM 103. The control program PR1 causes the authentication printing server 100, which is a computer, to function as the acquisition portion U11 and the selection execution portion U12. Therefore, it can be said that the control program PR1 causes the authentication printing server 100 to function as the processing portion U1. The authentication printing server 100 executing the control program PR1 performs an acquisition step corresponding to the acquisition function FU1 and a selection execution step corresponding to the selection execution function FU2.

FIG. 3 schematically illustrates the configuration of the image processing apparatus 200. The image processing apparatus 200 is provided with a CPU 201 as a processor, a ROM 202 as a semiconductor memory, a RAM 203 as a semiconductor memory, a storage portion 204, an operation portion 205, a display portion 206, a reading portion 207, a printing portion 208, a facsimile portion 209, an I/F 210 of a card reader 300, a network I/F 211, a clock circuit 212, and the like. These elements are electrically coupled so that information can be input and output to and from each other.

The storage portion 204 stores firmware and the like. The CPU 201 causes the image processing apparatus 200 to realize a plurality types of processing functions 800 as the image processing apparatus 200 by executing the firmware read from the storage portion 204 to the RAM 203. A nonvolatile semiconductor memory such as a flash memory, a magnetic storage device such as a hard disk, or the like can be used for the storage portion 204.

A touch panel attached to the surface of the display panel, a hard key, or the like can be used for the operation portion 205. The operation portion 205 can also receive operations of the plurality of types of processing functions 800. A liquid crystal display panel or the like can be used for the display portion 206. The reading portion 207 reads a document and generates scan data representing a read image. Therefore, the reading portion 207 executes at least the reading function 806 illustrated in FIG. 5. The printing portion 208 executes printing on a printing paper based on the print job J0. Therefore, the printing portion 208 executes at least the printing function 801 illustrated in FIG. 5. The image processing apparatus 200 exhibits a copying function 802 as illustrated FIG. 5 by reading a document with the reading portion 207 and printing the read image with the printing portion 208. The facsimile portion 209 facsimile-transmits an image read by the reading portion 207 to a transmission destination via a telephone line, and facsimile-receives an image from a transmission source via a telephone line. Therefore, the facsimile portion 209 performs at least the facsimile function 804 illustrated in FIG. 5. The image processing apparatus 200 can print the image received by the facsimile portion 209 with the printing portion 208. The I/F 210 is coupled to the card reader 300 and can receive the first authentication information IN1 from the card reader 300. The network I/F 211 is connected to the network NE1 and communicates with the authentication printing server 100 connected to the network NE1 according to a predetermined communication standard. For example, the network I/F 211 transmits the first authentication information IN1 and the like to the authentication printing server 100 and receives screen information D0, a print job J0, and the like from the authentication printing server 100. The clock circuit 212 can output the current date and time.

(3) Specific Example of System Processing

Figure 4:
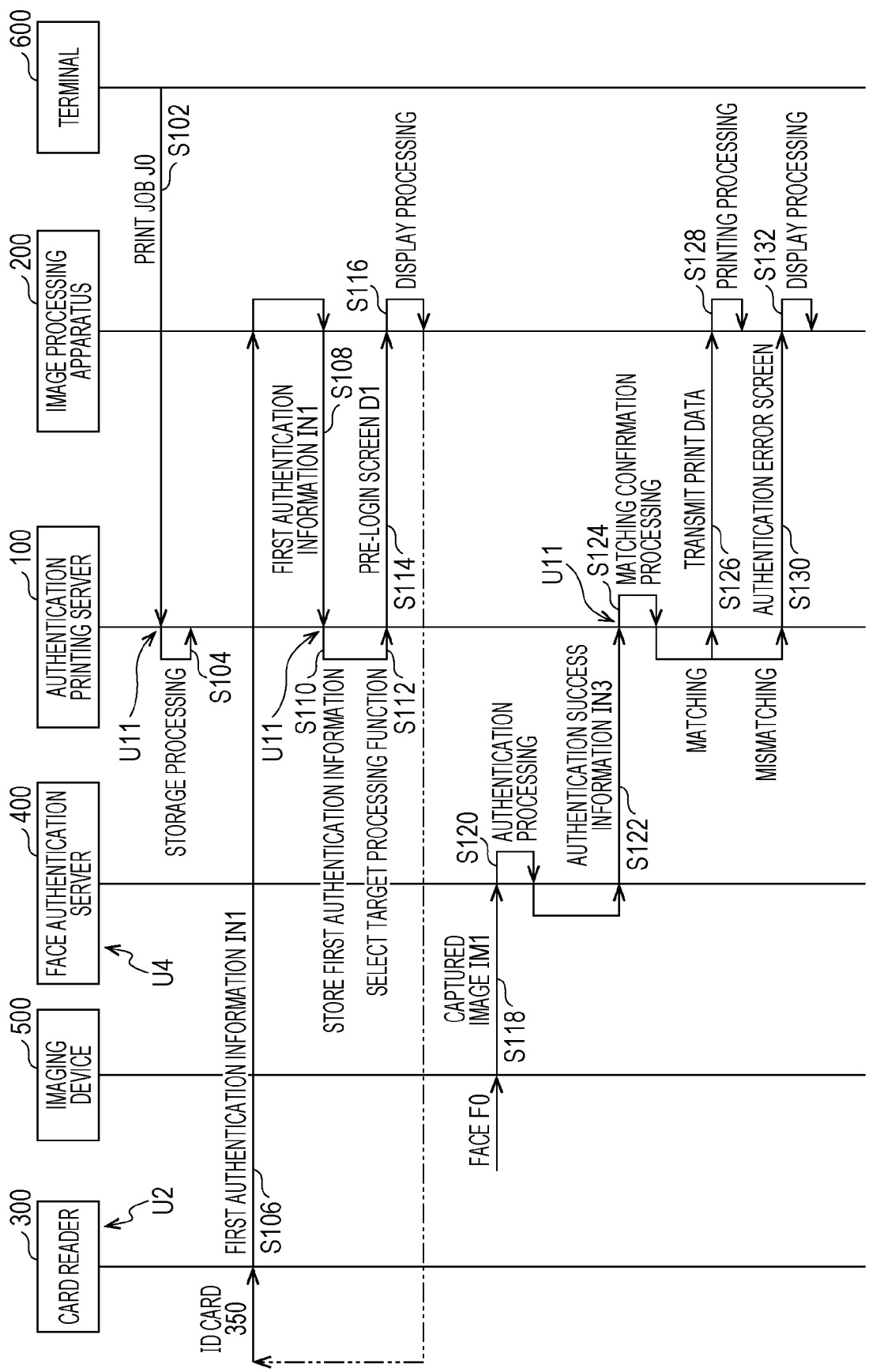
FIG. 4 is a diagram schematically illustrating an example of a flow of processing performed by the processing system.

FIG. 4 schematically illustrates the flow of processing performed in the processing system SY1. FIG. 4 illustrates a printing function 801 as an example of the target processing function 810 to be executed by the image processing apparatus 200. Here, steps S102, S108, and S122 correspond to the acquisition portion U11 and the acquisition function FU1. Step S104, steps S110 to S114, step S124, step S126, and step S130 correspond to the selection execution portion U12 and the selection execution function FU2. Hereinafter, the description of "step" may be omitted and the reference numeral of the step may be illustrated in parentheses. FIG. 5 schematically illustrates changes in the pre-login screen D1.

First, the terminal 600 receives an operation to register the print job J0 from the user US0, and transmits a registration request for the print job J0, that is, a print job registration request RE1 illustrated in FIG. 1 to the authentication printing server 100 (S102). When the print job registration request RE1 is received from the terminal 600, the authentication printing server 100 generates the print job J0 based on the print job registration request RE1, and performs storage processing for storing the print job J0 on the storage portion 104 in association with the user US0 (S104). As a result, the processing portion U1 holds the print job J0 associated with the user US0.

When the user US0 who has registered the print job J0 holds the ID card 350 over the card reader 300, the card reader 300 reads the first authentication information IN1 including information identifying the user US0 from the ID card 350, and transmits the first authentication information IN1 to the image processing apparatus 200 (S106). When the first authentication information IN1 is received from the card reader 300, the image processing apparatus 200 transmits the first authentication information IN1 to the authentication printing server 100 (S108). When the first authentication information IN1 is received from the image processing apparatus 200, the authentication printing server 100 saves the first authentication information IN1 including information identifying the user US0 on the storage portion 104 (S110). In addition, the authentication printing server 100 selects the target processing function 810 from the plurality of types of processing functions 800 based on the reading state of the first authentication information IN1 by the reading portion U2 (S112). After selecting the target processing function 810, the authentication printing server 100 transmits pre-login screen information for displaying the pre-login screen D1 indicating the selected target processing function 810 on the display portion 206 to the image processing apparatus 200 (S114). When the pre-login screen information is received from the authentication printing server 100, the image processing apparatus 200 performs display processing for displaying the pre-login screen D1 on the display portion 206 (S116). For example, the authentication printing server 100 first causes the display portion 206 to display a first pre-login screen D11 illustrating the printing function 801 as the target processing function 810 as illustrated in the uppermost portion of FIG. 5.

The first pre-login screen D11 illustrated in FIG. 5 has an icon for the printing function 801, an icon for the copying function 802, an icon for a scanning to folder function 803, and an icon for a facsimile function 804 among the plurality of types of processing functions 800. When the number of icons of the processing function 800 is too large to fit all the icons on one screen, the authentication printing server 100 can switch the page of the pre-login screen D1 and display the page on the display portion 206 like the seventh pre-login screen D17. The seventh pre-login screen D17 has an icon for a favorite function 805, an icon for a reading function 806, and an icon for a "printing from external memory" function 807 among the plurality of types of processing functions 800.

The processing of S106 to S116 is performed each time the user US0 holds the ID card 350 over the card reader 300. Saving processing of S110 may be omitted from the second time onwards. For example, when the card reader 300 reads the first authentication information IN1, the authentication printing server 100 sequentially switches the target processing functions 810 among the plurality of types of processing functions 800. For example, the authentication printing server 100 selects the printing function 801, the copying function 802, the scanning to folder function 803, the facsimile function 804, the favorite function 805, the reading function 806, and the "printing from external memory" function 807, as the target processing functions 810 in the order of operation of the ID card 350. As a result, the authentication printing server 100 causes the display portion 206 to display a first pre-login screen D11 indicating that the printing function 801 is the target processing function 810, a second pre-login screen D12 indicating that the copying function 802 is the target processing function 810, a third pre-login screen indicating that the scanning to folder function 803 is the target processing function 810, a fourth pre-login screen indicating that the facsimile function 804 is the target processing function 810, a fifth pre-login screen indicating that the favorite function 805 is the target processing function 810, a sixth pre-login screen indicating that the reading function 806 is the target processing function 810, and a seventh pre-login screen D17 indicating that the "printing from external memory" function 807 is the target processing function 810 in the order in which the ID card 350 is operated. In the example illustrated in FIG. 5, the icon for the target processing function 810 is highlighted in red or the like.

Furthermore, when the user US0 holds the ID card 350 over the card reader 300 after selecting the "printing from external memory" function 807, the authentication printing server 100 returns the target processing function 810 to the printing function 801. As a result, the authentication printing server 100 returns the screen displayed on the display portion 206 to the first pre-login screen D11. Therefore, the target processing function 810 circulates according to the operation of the ID card 350 among the plurality of types of processing functions 800.

When i is the number of times the first authentication information IN1 is read from the ID card 350 by the card reader 300, it can be said that the authentication printing server 100 selects the target processing function 810 from the plurality of types of processing functions 800 based on the number i of times. In the example illustrated in FIG. 5, as the target processing function 810, the authentication printing server 100 selects the printing function 801 when the remainder of the number i of times divided by 7 is 1, selects the copying function 802 when the remainder of the number i of times divided by 7 is 2, selects the scanning to folder function 803 when the remainder of the number i of times divided by 7 is 3, selects the facsimile function 804 when the remainder of the number i of times divided by 7 is 4, selects the favorite function 805 when the remainder of the number i of times divided by 7 is 5, selects the reading function 806 when the remainder of the number i of times divided by 7 is 6, and select the "printing from external memory" function 807 when the remainder of the number i of times divided by 7 is 0.

When the user US0 faces the face FO to the imaging device 500 in a state where the target processing function 810 is selected, the imaging device 500 photographs the face FO of the user US0 without contact, and transmits the captured image IM1 of the face FO to the face authentication server 400 (S118). When the captured image IM1 is received from the imaging device 500, the face authentication server 400 performs face authentication processing based on the captured image IM1 as the second authentication information IN2 (S120). When a feature amount having a degree of similarity to the feature amount of the face image included in the captured image IM1 greater than a threshold is registered in the face image database DB2, the face authentication server 400 generates authentication success information IN3 including information identifying the user US0, and transmits the authentication success information IN3 to the authentication printing server 100 (S122).

When the authentication success information IN3 is received from the face authentication server 400, the authentication printing server 100 performs matching confirmation processing to confirm whether or not the user associated with the first authentication information IN1 saved in the storage portion 104 is the same as the user identified by the authentication success information IN3 (S124).

When the authentication success information IN3 is based on the second authentication information IN2 associated with the user US0 associated with the first authentication information IN1, the authentication printing server 100 determines that the user US0 matches, and permits the login of the user US0. In this case, the authentication printing server 100 generates print data for printing based on the print job J0 associated with the user US0 identified by the first authentication information IN1 and the authentication success information IN3, transmits the print data to the image processing apparatus 200 (S126). When the print data is received from the authentication printing server 100, the image processing apparatus 200 executes the printing function 801 for printing according to the print data as the target processing function 810 (S128). As a result, printing based on the print job J0 is performed. For example, the user "US2" illustrated in FIG. 2 registers the print job "J2" in the authentication printing server 100, holds the ID card 350 over the card reader 300, selects the printing function 801 as the target processing function 810, and then faces the face FO to the imaging device 500. In this case, printing is performed based on the print job "J2" associated with the user "US2".

As described above, when the authentication success information IN3 based on the second authentication information IN2 associated with the user US0 associated with the first authentication information IN1 is acquired, the authentication printing server 100 causes the image processing apparatus 200 to execute the target processing function 810.

When the user associated with the first authentication information IN1 saved in the storage portion 104 is different from the user identified by the authentication success information IN3, the authentication printing server 100 determines that the user US0 does not match, and does not permit the login of the user US0. In this case, the authentication printing server 100 transmits to the image processing apparatus 200 authentication error screen information for displaying an authentication error screen (not illustrated) indicating that an authentication error is occurred on the display portion 206 (S130). When the authentication error screen information is received from the authentication printing server 100, the image processing apparatus 200 performs display processing for displaying the authentication error screen on the display portion 206 (S132).

FIG. 6 schematically illustrates processing performed by the selection execution portion U12 when the acquisition portion U11 first acquires the first authentication information IN1. The processing of S202 for receiving the first authentication information IN1 in FIG. 6 corresponds to the processing of S108 that is first performed in FIG. 4.

When the first authentication information IN1 is received from the image processing apparatus 200 in S202, the authentication printing server 100 saves the received first authentication information IN1 on the storage portion 104 (S204). The processing of S204 corresponds to saving processing of S110 in FIG. 4.

Next, the authentication printing server 100 selects the first processing function from the plurality of types of processing functions 800 as the target processing function 810 (S206). The processing of S206 corresponds to the selection processing of S112 that is first performed in FIG. 4. After selecting the target processing function 810, the authentication printing server 100 causes the display portion 206 to display the pre-login screen D1 indicating the selected target processing function 810 (S208). The processing of S208 corresponds to the transmission processing of S114 in FIG. 4.

After the pre-login screen D1 is displayed, the authentication printing server 100 proceeds the processing to S212 when the first authentication information IN1 is received from the image processing apparatus 200 again, and proceeds the processing to S216 when the first authentication information IN1 is not received (S210).

When receiving the first authentication information IN1, the authentication printing server 100 determines whether the user associated with the first authentication information IN1 read this time is the same as the user associated with the first authentication information IN1 read last time (S212). When the current user is the same as the previous user, the authentication printing server 100 selects the target processing function 810 corresponding to the number i of times the first authentication information IN1 is continuously read from the plurality of types of processing functions 800 (S214), and proceeds the processing to S216. Therefore, when the first authentication information IN1 is continuously read by the card reader 300, the selection execution portion U12 switches the target processing function 810 among the plurality of types of processing functions 800 in a case in which the user US0 is associated with the first authentication information IN1 read this time and the first authentication information IN1 read last time. On the other hand, when the current user is different from the previous user, the authentication printing server 100 returns the processing to S204.

In S216, the authentication printing server 100 proceeds the processing to S218 when the authentication success information IN3 is received from the face authentication server 400, and returns the processing to S210 when the authentication success information IN3 is not received from the face authentication server 400. Therefore, the selection processing of the target processing function 810 in S210 to S214 is repeated until the authentication success information IN3 is received. When the authentication success information IN3 is received, the authentication printing server 100 determines whether the user associated with the first authentication information IN1 saved in the storage portion 104 is the same as the user identified by the authentication success information IN3 (S218). The processing of S218 corresponds to the matching confirmation processing of S124 in FIG. 4.

When the user identified by the authentication success information IN3 is associated with the first authentication information IN1, the authentication printing server 100 permits the login of the user US0, and causes the image processing apparatus 200 to execute the selected target processing function 810 (S220). When the selected target processing function 810 is the printing function 801, the processing of S126 illustrated in FIG. 4 is performed. Thereafter, the authentication printing server 100 ends the processing illustrated in FIG. 6.

When the user identified by the authentication success information IN3 is not associated with the first authentication information IN1, the authentication printing server 100 does not permit the login of the user US0 and causes the display portion 206 to display an authentication error screen (S222). The processing of S222 corresponds to the transmission processing of S130 in FIG. 4. Thereafter, the authentication printing server 100 ends the processing illustrated in FIG. 6.

As described above, the user US0 can select the target processing function 810 to be executed by the image processing apparatus 200 based on the state where the card reader 300 reads the first authentication information IN1 recorded on the ID card 350. When face authentication is performed without touching the operation portion 205 of the image processing apparatus 200, the image processing apparatus 200 executes the selected target processing function 810. Therefore, the user US0 can cause the image processing apparatus 200 to execute the desired processing function 800 without touching the operation portion 205 of the image processing apparatus 200.

In addition, when the user identified by the ID card 350 does not match the user whose face authentication is performed, the selected target processing function 810 is not executed. Therefore, impersonating, such as an unauthorized user illegally using an ID card 350 of another person to log in, or an unauthorized user illegally using a face photograph of another person to log in, is suppressed.

(4) Modification Example

Various modification examples of the present disclosure are considered.

For example, the authentication printing server 100 may include the authentication portion U4 and the processing portion U1.

Authentication performed by the authentication portion U4 is not limited to face authentication, and may be iris authentication or the like.

The processing described above can be changed as appropriate, such as by changing the order. For example, in the processing illustrated in FIG. 6, the authentication printing server 100 may perform the saving processing of S204 after the selection processing of S206. In addition, the above-described processing is not limited to the example executed by the CPU, and may be executed by an electronic component such as an ASIC. Here, ASIC is an abbreviation for Application Specific Integrated Circuit. In addition, the above-described processing may be distributed by a plurality of CPUs, or may be executed by cooperation between the CPU and electronic components such as ASIC.

As illustrated in FIGS. 7 and 8, the reading portion U2 may be divided into a plurality of information reading portions. FIG. 7 schematically illustrates the configuration of a system including a processing system SY1 in which the reading portion U2 includes the plurality of information processing portions. FIG. 8 schematically illustrates processing performed by the selection execution portion U12 when the reading portion U2 includes the plurality of information processing portions. In FIGS. 7 and 8, elements that are the same as those illustrated in FIGS. 1 and 6 are labeled with the same reference numerals.

In the processing system SY1 illustrated in FIG. 7, the card reader 300 is replaced with a first card reader 301, a second card reader 302, a third card reader 303, . . . , compared to the processing system SY1 illustrated in FIG. 1. Therefore, the reading portion U2 includes the first card reader 301, the second card reader 302, the third card reader 303, . . . . In the processing illustrated in FIG. 8, S202 is replaced with S302, S206 is replaced with S304, and S210 to S214 are eliminated, compared to the processing illustrated in FIG. 6.

Each card reader included in the reading portion U2 is assigned to the processing function 800 illustrated in FIG. 5, and can read the first authentication information IN1 from the ID card 350. In the example illustrated in FIGS. 7 and 8, it is assumed that the printing function 801 is assigned to the first card reader 301, the copying function 802 is assigned to the second card reader 302, the scanning to folder function 803 is assigned to the third card reader 303, the facsimile function 804 is assigned to a fourth card reader (not illustrated), the favorite function 805 is assigned to a fifth card reader (not illustrated), a reading function 806 is assigned to a sixth card reader (not illustrated), and a "printing from external memory" function 807 is assigned to a seventh card reader (not illustrated). Here, any one of the seven card readers included in the reading portion U2 can be applied to the first information reading portion U21, and any one of the remaining can be applied to the second information reading portion U22. In the example illustrated in FIGS. 7 and 8, the first card reader 301 to which the printing function 801 is assigned is applied to the first information reading portion U21, and the second card reader 302 to which the copying function 802 is assigned is applied to the second information reading portion U22. Here, the printing function 801 is an example of the first processing function, and the copying function 802 is an example of the second processing function. As illustrated in FIG. 8, the authentication printing server 100 holds an information table T1 indicating correspondence between the information processing portions and the processing functions 800 in the storage portion 104 illustrated in FIG. 2, for example. When the first authentication information IN1 is received from any card reader included in the reading portion U2, the image processing apparatus 200 transmits the first authentication information IN1 and information identifying the card reader that received the first authentication information IN1 to the authentication printing server 100.

In the processing illustrated in FIG. 8, when the first authentication information IN1 and the information identifying the card reader are received from the image processing apparatus 200 in S302, the authentication printing server 100 saves the received first authentication information IN1 on the storage portion 104 (S204). Next, the authentication printing server 100 selects the processing function 800 corresponding to the card reader that read the first authentication information IN1 as the target processing function 810 (S304). For example, according to the information table T1, the authentication printing server 100 selects the printing function 801 as the target processing function 810 when the first card reader 301 reads the first authentication information IN1, and selects the copying function 802 as the target processing function 810 when the second card reader 302 reads the first authentication information IN1. After selecting the target processing function 810, the authentication printing server 100 causes the display portion 206 to display the pre-login screen D1 indicating the selected target processing function 810 (S208). After displaying the pre-login screen D1, the authentication printing server 100 waits until authentication success information IN3 is received from the face authentication server 400 (S216). When the authentication success information IN3 is received, the authentication printing server 100 determines whether the user associated with the first authentication information IN1 saved in the storage portion 104 is the same as the user identified by the authentication success information IN3 (S218). When the user identified by the authentication success information IN3 is associated with the first authentication information IN1, the authentication printing server 100 causes the image processing apparatus 200 to execute the selected target processing function 810 (S220). When the user identified by the authentication success information IN3 is not associated with the first authentication information IN1, the authentication printing server 100 does not permit the login of the user US0 and causes the display portion 206 to display an authentication error screen (S222).

As described above, the user US0 can select different target processing functions 810 according to the information reading portion that reads the ID card 350. Therefore, the examples illustrated in FIGS. 7 and 8 are suitable examples of causing the image processing apparatus 200 to execute the desired processing function 800.

As illustrated in FIG. 9, the processing function with setting 820 capable of changing the content of setting may be included in the plurality of types of processing functions 800. The user US0 may set the content of the processing function with setting 820 by the gesture. FIG. 9 schematically illustrates the processing performed by the selection execution portion U12 when the gesture information G0 corresponding to the content of setting of the processing function with setting 820 is acquired. In the processing illustrated in FIG. 9, processing of S312 to S314 are added to the processing illustrated in FIG. 6. The configuration for realizing the processing illustrated in FIG. 9 is the same as the configuration illustrated in FIG. 1.

When captured image IM1 received from the imaging device 500 includes a gesture of user US0, the face authentication server 400 illustrated in FIG. 1 detects the gesture of user US0 and acquires gesture information G0 indicating the gesture of user US0. For example, when the user US0 puts out his/her hand with one or more fingers raised on the side of the face FO and faces the face FO toward the imaging device 500, captured image IM1 including a face image and a hand image is generated. The face authentication server 400 received the captured image IM1 can extract the hand image from the captured image IM1 and detect the number of raised fingers. When detecting the number of raised fingers, the face authentication server 400 transmits the number of raised fingers as gesture information G0 and the authentication success information IN3 to the authentication printing server 100.

As illustrated in FIG. 9, each content of the settings of the processing function with setting 820 is associated with the gesture of the user US0. In the example illustrated in FIG. 9, the printing function 801 is the processing function with setting 820, print one copy corresponds to a gesture of raising one finger, print two copies corresponds to a gesture of raising two fingers, and print three copies corresponds to a gesture of raising three fingers. Therefore, the face authentication server 400 is an example of the authentication portion U4 and also an example of a detection portion that detects a gesture corresponding to the content of setting of the processing function with setting 820. The authentication printing server 100 holds an information table T2 indicating correspondence between gestures and the content of setting in the storage portion 104 illustrated in FIG. 2, for example.

In the processing illustrated in FIG. 9, when the first authentication information IN1 is received from the image processing apparatus 200 in S202, the authentication printing server 100 performs the processing of S204 to S218 illustrated in FIG. 6. When the user identified by the authentication success information IN3 is associated with the first authentication information IN1, the authentication printing server 100 determines whether or not the information received from the face authentication server 400 includes the gesture information G0 (S312). When the gesture information G0 is present, the authentication printing server 100 sets the target processing function 810 to the content corresponding to the gesture of the user US0 based on the gesture information G0 (S314). When the target processing function 810 is the printing function 801, the authentication printing server 100 sets the printing function 801 to the content corresponding to the gesture of the user US0. For example, according to the information table T2, the authentication printing server 100 sets the printing function 801 to print one copy when the gesture information G0 indicates one finger, sets the printing function 801 to print two copies when the gesture information G0 indicates two fingers, and sets the printing function 801 to print three copies when the gesture information G0 indicates three fingers. After setting the content of the target processing function 810, the authentication printing server 100 causes the image processing apparatus 200 to execute the target processing function 810 (S220).

As described above, when the processing function with setting 820 is selected as the target processing function 810, the authentication success information IN3 is acquired, and the gesture information G0 is acquired, the authentication printing server 100 causes the image processing apparatus 200 to execute the processing function with setting 820 set to the content corresponding to the gesture of the user US0.

When the user identified by the authentication success information IN3 is not associated with the first authentication information IN1, the authentication printing server 100 causes the display portion 206 to display an authentication error screen (S222).

As described above, the user US0 can cause the image processing apparatus 200 to execute the processing function with setting 820 set to the content corresponding to the gesture. Therefore, the example illustrated in FIG. 9 can improve convenience for the user US0.

In addition to the number of printing copies of the printing function 801, the settings of the processing function with setting 820 may be the size of printing paper, the setting of color printing or monochrome printing, the number of copying of the copying function 802, and the like.

As illustrated in FIGS. 10 and 11, presets for processing functions 800 may be prepared. The plurality of types of processing functions 800 may include the pre-settable processing function 830 for which presets can be prepared. The prepared preset may be associated with the gesture of the user US0. FIG. 10 schematically illustrates the preset screen D2 displayed on the terminal 600. FIG. 11 schematically illustrates processing performed by the selection execution portion U12 when the gesture information G0 corresponding to the preset of the pre-settable processing function 830 is acquired. The processing illustrated in FIG. 11 is obtained by adding the processing of S322 to S324 to the processing illustrated in FIG. 6. The configuration for realizing the processing illustrated in FIG. 11 is the same as the configuration illustrated in FIG. 1.

The authentication printing server 100 can display the preset screen D2 for preparing a preset for the pre-settable processing function 830 on the display device of the terminal 600 in response to a request from the terminal 600. As illustrated in FIG. 10, each preset of pre-settable processing function 830 is associated with the gesture of the user US0. In the example illustrated in FIG. 10, the copying function 802 is the pre-settable processing function 830, A4 monochrome copy corresponds to a gesture of raising one finger, A4 color copy corresponds to a gesture of raising two fingers, and A3 monochrome copy corresponds to a gesture of raising three fingers. Therefore, the face authentication server 400 is an example of the authentication portion U4 and also an example of a detection portion that detects a gesture corresponding to the preset of the pre-settable processing function 830. The terminal 600 receives a preset associated with each gesture in the information table T3 included in the preset screen D2 through the input device. When the input device receives the operation of a determination button 831 on the preset screen D2, the terminal 600 transmits to the authentication printing server 100 a request to save the information table T3 created on the preset screen D2. When the request to save the information table T3 is received from the terminal 600, the authentication printing server 100 saves the information table T3 indicating the correspondence between the gesture and the preset on the storage portion 104.

The operation to prepare the preset is not limited to the operation from the terminal 600, and may be the operation from the display portion 206 of the image processing apparatus 200 or the like.

In the processing illustrated in FIG. 11, when the first authentication information IN1 is received from the image processing apparatus 200 in S202, the authentication printing server 100 performs the processing of S204 to S218 illustrated in FIG. 6. When the user identified by the authentication success information IN3 is associated with the first authentication information IN1, the authentication printing server 100 determines whether or not the information received from the face authentication server 400 includes the gesture information G0 (S322). When the gesture information G0 is present, the authentication printing server 100 applies the preset corresponding to the gesture of the user US0 to the target processing function 810 based on the gesture information G0 (S324). When the target processing function 810 is the copying function 802, the authentication printing server 100 applies the preset corresponding to the gesture of the user US0 to the copying function 802. For example, according to the information table T3, the authentication printing server 100 applies A4 monochrome copying to the copying function 802 when the gesture information G0 indicates one finger, applies A4 color copying to the copying function 802 when the gesture information G0 indicates two fingers, and applies A3 monochrome copying to the copying function 802 when the gesture information G0 indicates three fingers. After applying the preset, the authentication printing server 100 causes the image processing apparatus 200 to execute the target processing function 810 (S220).

As described above, the pre-settable processing function 830 is selected as the target processing function 810, the authentication success information IN3 is acquired, and the gesture information G0 is acquired, the authentication printing server 100 causes the image processing apparatus 200 to execute the pre-settable processing function 830 according to the preset corresponding to the gesture of the user US0.

When the user identified by the authentication success information IN3 is not associated with the first authentication information IN1, the authentication printing server 100 causes the display portion 206 to display an authentication error screen (S222).

As described above, the user US0 can cause the image processing apparatus 200 to execute the pre-settable processing function 830 according to the preset corresponding to the gesture. Therefore, the examples illustrated in FIGS. 10 and 11 can improve convenience.

The preset of the pre-settable processing function 830 may be the size of printing paper in the printing function 801, the preset of color printing or monochrome printing, the transmission destination of read data in the reading function 806, and the like. A folder, an e-mail address, or the like can be considered as the transmission destination of the read data.

The gesture corresponding to the content of setting of the processing function with setting 820 or the presetting of the pre-settable processing function 830 is not limited to the number of raised fingers. The gesture may be a finger shape, an arm shape, a facial expression, or the like. The finger shape includes the shape of letters such as alphabets, the shape of animals such as a fox, and the like. The arm shape includes a round shape, an X mark, and the like. The facial expression includes an expression with eyes or mouth wide open, an expression with one eye closed, and the like. The face authentication server 400 may generate the gesture information G0 based on the captured image received from the imaging device 500 separately from the captured image IM1 including the face image. In addition, the gesture may be the action of shaking the hand left, right, and front/rear, the action of bending and stretching fingers, the action of neck and shoulder, the action of blinking a predetermined number of times, and the like.

As illustrated in FIGS. 12 and 13, the processing system SY1 may include the authentication information reading portion U3 that reads the first authentication information IN1 from the ID card 350 separately from the reading portion U2. FIG. 12 schematically illustrates the configuration of a system including a processing system SY1 provided with the authentication information reading portion U3. In FIG. 12, elements that are the same as those illustrated in FIG. 1 are labeled with the same reference numerals. FIG. 13 schematically illustrates processing performed by the selection execution portion U12 when the processing system SY1 is provided with the authentication information reading portion U3. By causing the authentication information reading portion U3 to read the first authentication information IN1 of the ID card 350, the user US0 may cause the image processing apparatus 200 to execute the target processing function 810 after operating the operation portion 205 of the image processing apparatus 200 to select the target processing function 810 from the plurality of types of processing functions 800.

In the processing system SY1 illustrated in FIG. 7, a direct login card reader 310 is added to the processing system SY1 illustrated in FIG. 1. The direct login card reader 310 is an example of the authentication information reading portion U3 that reads the first authentication information IN1 from the ID card 350 separately from the card reader 300. When the first authentication information IN1 is received from the card reader 300, the image processing apparatus 200 transmits the first authentication information IN1 and information identifying the card reader 300 to the authentication printing server 100. In addition, when the first authentication information IN1 is received from the direct login card reader 310, the image processing apparatus 200 transmits the first authentication information IN1 and the information identifying the direct login card reader 310 to the authentication printing server 100.

When the information identifying the card reader 300 or the direct login card reader 310 and the first authentication information IN1 are received from the image processing apparatus 200 in S332, the authentication printing server 100 starts the processing illustrated in FIG. 13. First, the authentication printing server 100 determines whether or not the direct login card reader 310 is used to read the first authentication information IN1 (S334). When the card reader 300 is used to read the first authentication information IN1, the authentication printing server 100 performs the processing of S204 to S222 illustrated in FIG. 6, and ends the processing illustrated in FIG. 13.

When the direct login card reader 310 is used to read the first authentication information IN1, the authentication printing server 100 performs authentication processing for authentication based on the first authentication information IN1 (S336). The authentication printing server 100 permits login of the user US0 when the first authentication information IN1 is registered in the authentication database DB1. When the user US0 is authenticated, the authentication printing server 100 transmits to the image processing apparatus 200 selection screen information for displaying the selection screen D3 illustrated in FIG. 13 on the display portion 206 (S338). When the selection screen information is received from the authentication printing server 100, the image processing apparatus 200 performs display processing for displaying the selection screen D3 on the display portion 206 provided with the operation portion 205 provided on the surface. The selection screen D3 has a processing function button 840 corresponding to each of the processing functions 800 illustrated in FIG. 5. FIG. 13 illustrates the printing function button 841 corresponding to the printing function 801, the copying function button 842 corresponding to the copying function 802, the scanning to folder function button 843 corresponding to the scanning to folder function 803, and the facsimile function button 844 corresponding to the facsimile function 804. Although not illustrated, a favorite function button corresponding to the favorite function 805, a reading function button corresponding to the reading function 806, and a "printing from external memory" function button corresponding to the "printing from external memory" function 807 are also displayed on the selection screen D3. The processing function buttons 840 collectively refers to the printing function button 841, the copying function button 842, the scanning to folder function button 843, the facsimile function button 844, the favorite function button, the reading function button, and the "printing from external memory" function button.

As described above, when the first authentication information IN1 is read by the direct login card reader 310, the authentication printing server 100 causes the display portion 206 to display the selection screen D3 for receiving selection of the target processing function 810 from the plurality of types of processing functions 800.

The operation portion 205 of the image processing apparatus 200 receives operation of the processing function button corresponding to the target processing function 810 to be executed by the image processing apparatus 200 from the plurality of processing function buttons 840, and transmits selection information indicating the operated processing function button to the authentication printing server 100. When the selection information described above is received from the image processing apparatus 200, the authentication printing server 100 causes the image processing apparatus 200 to execute the target processing function 810 corresponding to the processing function button 840 indicated by the selection information (S340), and ends the processing illustrated in FIG. 13.

As described above, the user US0 can select the processing function 800 to be executed by the image processing apparatus 200 by causing the direct login card reader 310 to read the first authentication information IN1 recorded on the ID card 350. Therefore, the examples illustrated in FIGS. 12 and 13 can improve convenience.

As illustrated in FIG. 14, the processing system SY1 may not include the authentication printing server 100, and the image processing apparatus 200 may include the processing portion U1. FIG. 14 schematically illustrates another configuration of a system including a processing system SY1. The system includes the image processing apparatus 200, the card reader 300, the face authentication server 400, the imaging device 500, and the terminal 600. The processing system SY1 includes the image processing apparatus 200 and the card reader 300. The image processing apparatus 200 includes the operation portion 205, the display portion 206, the processing portion U1, and the like. The control program PR1 that causes the image processing apparatus 200 to function as the processing portion U1 causes the image processing apparatus 200 to realize the acquisition function FU1 for the first authentication information IN1, the authentication success information IN3, and the like, and the selection execution function FU2 for executing the processing function 800. The acquisition function FU1 and network I/F 107 constitute the acquisition portion U11. The selection execution function FU2 corresponds to the selection execution portion U12.

The acquisition portion U11 can acquire the first authentication information IN1 read from the ID card 350 by the card reader 300. In addition, the acquisition portion U11 can acquire the authentication success information IN3 indicating that the authentication is performed based on the second authentication information IN2 from the face authentication server 400 without touching the operation portion 205. The selection execution portion U12 selects the target processing function 810 from the plurality of types of processing functions 800 based on the reading state of the first authentication information IN1 by the card reader 300. In addition, the selection execution portion U12 executes the target processing function 810 when the acquisition portion U11 acquires the authentication success information IN3.

As described above, the image processing apparatus 200 illustrated in FIG. 14 can execute the desired processing function 800 without touching the operation portion 205. As a matter of course, the image processing apparatus 200 may include the authentication portion U4.

(5) Conclusion

As described above, according to the present disclosure, in various aspects, it is possible to provide techniques for causing the image processing apparatus 200 to execute the desired processing function 800 without touching the operation portion 205 of the image processing apparatus 200. As a matter of course, the above-described basic actions and effects can be obtained even with a technique including only the constituent elements of the independent aspects.

In addition, a configuration in which each configuration disclosed in the above examples is replaced with each other or the combination thereof is changed, and a configuration in which each configuration disclosed in the known technique and the above examples is replaced with each other or the combination thereof is changed, and the like can also be performed. The present disclosure also includes these configurations and the like.

What is claimed is:

1. A processing system that permits a user to use an image processing apparatus provided with an operator and having a plurality of types of processing functions, the processing system comprising:
   a reader configured to read first authentication information from a recording medium on which the first authentication information is recorded in a readable manner; and
   a processor configured to:
      select a target processing function from the plurality of types of processing functions based on a reading state of the first authentication information by the reader;
      control a display screen of the image processing apparatus to indicate the selection of the target processing function;
      acquire authentication success information, wherein the authentication success information indicates that authentication is performed based on second authentication information different from the first authentication information; and
      control the image processing apparatus to execute the selected target processing function, when the authentication success information is acquired in a state where the selected target processing function is indicated on the display screen, wherein the authentication based on the second authentication information is performed subsequent to the selection of the target processing function.

2. The processing system according to claim 1, wherein the first authentication information is associated with the user, and
   when the authentication success information based on the second authentication information associated with the user is acquired, the processor is further configured to cause the image processing apparatus to execute the target processing function.

3. The processing system according to claim 1, wherein the processor is further configured to select the target processing function from the plurality of types of processing functions based on a number of times the first authentication information is read by the reader.

4. The processing system according to claim 1, wherein the processor is further configured to switch the target processing function among the plurality of types of processing functions when the first authentication information is read by the reader.

5. The processing system according to claim 1, wherein when the first authentication information is continuously read by the reader, the processor is further configured to switch the target processing function among the plurality of types of processing functions in a case in which the user is associated with the first authentication information read currently and the first authentication information read last time.

6. The processing system according to claim 1, wherein the reader includes a first information reader that reads the first authentication information from the recording medium, and a second information reader that reads the first authentication information from the recording medium separately from the first information reader,
the plurality of types of processing functions include a first processing function, and a second processing function different from the first processing function, and
the processor is further configured to:
 select the first processing function as the target processing function when the first authentication information is read by the first information reader; and
 select the second processing function as the target processing function when the first authentication information is read by the second information reader.

7. The processing system according to claim 1, wherein the image processing apparatus is configured to print,
the plurality of types of processing functions include a printing function, and
the processor is further configured to:
 hold a print job associated with the user; and
 cause the image processing apparatus to execute the printing function based on the print job, when the printing function is selected from the plurality of types of processing functions and the authentication success information is acquired.

8. The processing system according to claim 1, wherein the plurality of types of processing functions include a processing function with setting configured to change a content of a setting, and
the processor is further configured to:
 acquire gesture information indicating a gesture from a detector that detects the gesture which is the gesture of the user and corresponds to the content of the setting; and
 cause the image processing apparatus to execute the processing function with the setting set to the content corresponding to the gesture, when the processing function with the setting is selected as the target processing function, the authentication success information is acquired, and the gesture information is acquired.

9. The processing system according to claim 1, wherein the plurality of types of processing functions include a pre-settable processing function configured to prepare a preset, and
the processor is further configured to:
 acquire gesture information indicating a gesture from a detector that detects the gesture which is the gesture of the user and corresponds to the preset; and
 cause the image processing apparatus to execute the pre-settable processing function according to the preset corresponding to the gesture, when the pre-settable processing function is selected as the target processing function, the authentication success information is acquired, and the gesture information is acquired.

10. The processing system according to claim 1, wherein the processing system further includes an authentication information reader that reads the first authentication information from the recording medium separately from the reader, and
when the first authentication information is read by the authentication information reader, the processor is further configured to cause the display screen to display a selection screen that receives the selection of the target processing function from the plurality of types of processing functions.

11. The processing system according to claim 1, wherein the processor is connected to the image processing apparatus via a network, and
the processor is further configured to cause the image processing apparatus to execute the target processing function via the network.

12. The processing system according to claim 1, wherein the processor is included in the image processing apparatus.

13. The processing system according to claim 1, wherein the authentication based on the second authentication information is performed without touching the operator.

14. The processing system according to claim 1, wherein the second authentication information includes a captured image of the user, and
the processor is further configured to:
 change a setting related to the selected target processing function based on detection of a gesture, wherein the gesture is detected from the captured image used for the authentication using the second authentication information; and
 control the image processing apparatus to execute the selected target processing function with the changed setting when the authentication success information is acquired.

15. An information processing apparatus coupled to an image processing apparatus provided with an operator and having a plurality of types of processing functions, the information processing apparatus comprising:
at least one processor configured to:
 acquire first authentication information read by a reader from a recording medium on which the first authentication information is recorded in a readable manner;
 select a target processing function from the plurality of types of processing functions based on a reading state of the first authentication information by the reader, wherein the image processing apparatus includes a display screen that indicates the selection of the target processing function;
 acquire authentication success information, wherein the authentication success information indicates that authentication is performed based on second authentication information different from the first authentication information; and
 control the image processing apparatus to execute the selected target processing function, when the authentication success information is acquired in a state where the selected target processing function is indicated on the display screen, wherein the authentication based on the second authentication information is performed subsequent to the selection of the target processing function.

16. A non-transitory computer-readable storage medium storing computer-executable instructions for permitting a user to use an image processing apparatus provided with an operator and having a plurality of types of processing functions, the computer-executable instructions cause a computer to execute operations, the operations comprising:
   acquiring first authentication information read by a reader from a recording medium on which the first authentication information is recorded in a readable manner;
   selecting a target processing function from the plurality of types of processing functions based on a reading state of the first authentication information by the reader, wherein the image processing apparatus includes a display screen that indicates the selection of the target processing function;
   acquiring authentication success information, wherein the authentication success information indicates that authentication is performed based on second authentication information different from the first authentication information; and
   controlling the image processing apparatus to execute the selected target processing function, when the authentication success information is acquired in a state where the selected target processing function is indicated on the display screen, wherein the authentication based on the second authentication information is performed subsequent to the selection of the target processing function.

17. An image processing apparatus having a plurality of types of processing functions, the image processing apparatus comprising:
   an operator; and
   at least one processor configured to:
      acquire first authentication information read by a reader from a recording medium on which the first authentication information is recorded in a readable manner;
      select a target processing function from the plurality of types of processing functions based on a reading state of the first authentication information by the reader;
      control a display screen of the image processing apparatus to indicate the selection of the target processing function;
      acquire authentication success information, wherein the authentication success information indicates that authentication is performed based on second authentication information different from the first authentication information; and
      execute the selected target processing function, when the authentication success information is acquired in a state where the selected target processing function is indicated on the display screen, wherein the authentication based on the second authentication information is performed subsequent to the selection of the target processing function.

18. A processing system that permits a user to use an image processing apparatus provided with an operator and having a plurality of types of processing functions, the processing system comprising:
   a reader configured to read first authentication information from a recording medium on which the first authentication information is recorded in a readable manner; and
   a processor configured to:
      select a target processing function from the plurality of types of processing functions based on a reading state of the first authentication information by the reader;
      acquire authentication success information, wherein
         the authentication success information indicates that authentication is performed based on second authentication information different from the first authentication information, and
         the second authentication information includes a captured image of the user;
      change a setting related to the selected target processing function based on detection of a gesture, wherein the gesture is detected from the captured image used for the authentication using the second authentication information; and
      control the image processing apparatus to execute the selected target processing function with the changed setting when the authentication success information is acquired, wherein the authentication based on the second authentication information is performed subsequent to the selection of the target processing function.

* * * * *